US012584805B2

(12) United States Patent
Ono

(10) Patent No.: US 12,584,805 B2
(45) Date of Patent: Mar. 24, 2026

(54) LOAD DETECTION DEVICE AND GAIN ADJUSTMENT METHOD OF LOAD DETECTION DEVICE

(71) Applicant: SUBARU CORPORATION, Tokyo (JP)

(72) Inventor: Tsubasa Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 295 days.

(21) Appl. No.: 18/689,388

(22) PCT Filed: Jun. 29, 2022

(86) PCT No.: PCT/JP2022/026039
§ 371 (c)(1),
(2) Date: Mar. 5, 2024

(87) PCT Pub. No.: WO2024/004096
PCT Pub. Date: Jan. 4, 2024

(65) Prior Publication Data
US 2024/0385062 A1 Nov. 21, 2024

(51) Int. Cl.
*G01L 1/22* (2006.01)
*G01L 5/00* (2006.01)

(52) U.S. Cl.
CPC .......... *G01L 1/2262* (2013.01); *G01L 5/0019* (2013.01)

(58) Field of Classification Search
CPC ....... G01L 1/2262; G01L 5/0019; G01L 1/22; G01L 5/1627
See application file for complete search history.

(56) References Cited

U.S. PATENT DOCUMENTS 4,762,006 A * 8/1988 Asakawa ................ G01L 1/044
73/862.044
5,710,716 A 1/1998 Hurst et al.
(Continued)

FOREIGN PATENT DOCUMENTS

JP H8-247868 A 9/1996
JP H11-271163 A 10/1999
JP 2019-39871 A 3/2019

OTHER PUBLICATIONS

International Search Report issued in corresponding Application No. PCT/JP2022/026039, dated Aug. 2, 2022 w/ English Translation.

*Primary Examiner* — Xin Y Zhong
(74) *Attorney, Agent, or Firm* — Rimon P.C.

(57) ABSTRACT
A load detection device for detecting a load, based on a differential signal output from a load cell including an excitation-side differential amplifier circuit for amplifying an excitation signal to be transmitted to the load cell, a measurement-side differential amplifier circuit for amplifying a first differential signal output from the load cell, and a control device for controlling the circuits. The control device executes a gain adjustment process of adjusting an output gain by selecting an excitation-side gain by the excitation-side differential amplifier circuit and a measurement-side gain by the measurement-side differential amplifier circuit such that a measurement value measured based on a second differential signal output from the measurement-side differential amplifier circuit falls within a predetermined range. The gains are selected from among candidate excitation-side gain values set at predetermined intervals as the excitation-side gain and candidate measurement-side gain values set at predetermined intervals as the measurement-side gain.

12 Claims, 11 Drawing Sheets

(56)            References Cited

U.S. PATENT DOCUMENTS 6,898,988  B2 *   5/2005   Barua  .................. G01G 19/021
                                                            73/862
2019/0064227  A1 *   2/2019   Takahashi ................ G01B 7/18

* cited by examiner

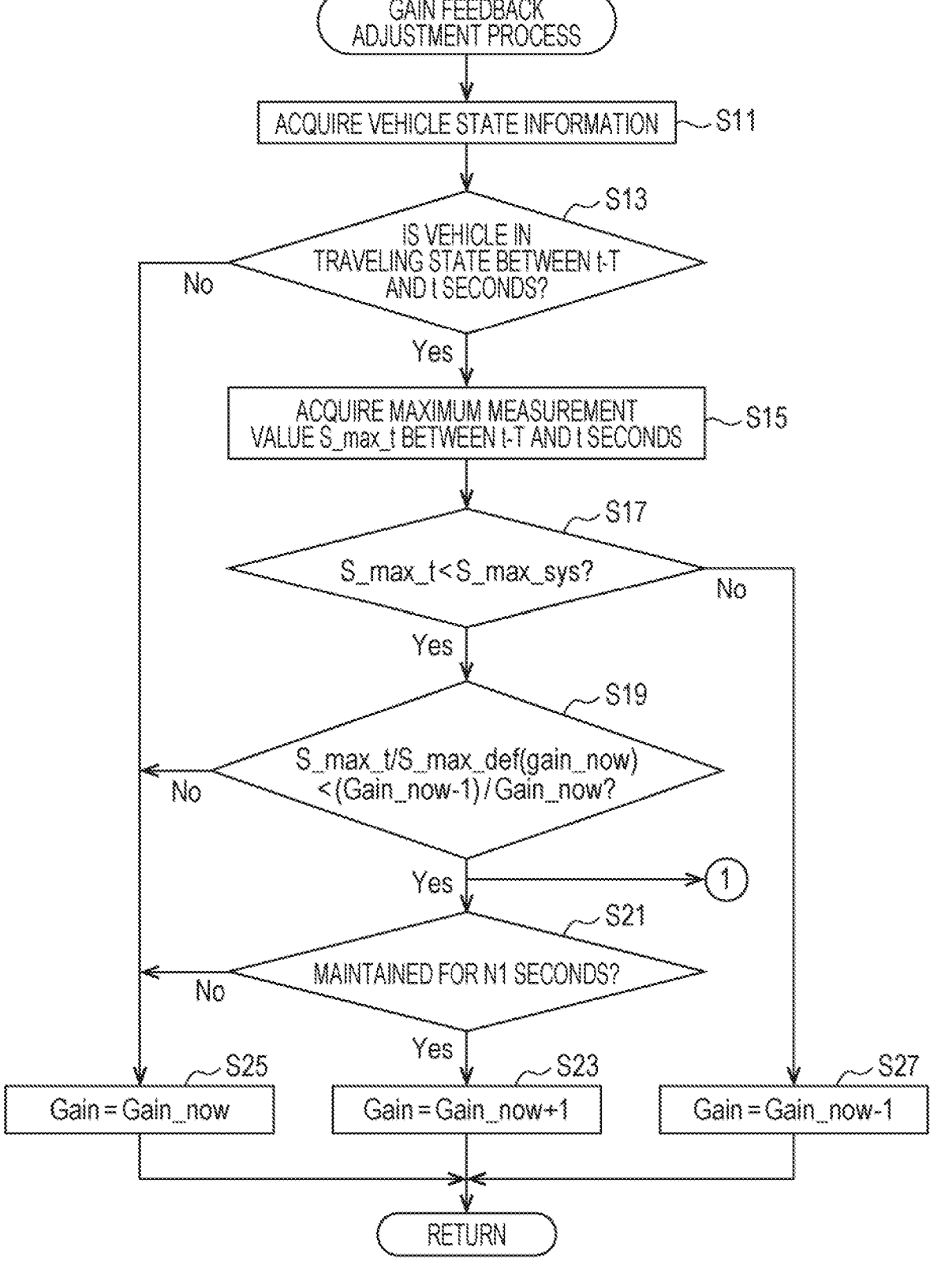

GAIN FEEDBACK
ADJUSTMENT PROCESS

ACQUIRE VEHICLE STATE INFORMATION — S11

IS VEHICLE IN
TRAVELING STATE BETWEEN t-T
AND t SECONDS? S13

No

Yes

ACQUIRE MAXIMUM MEASUREMENT
VALUE S_max_t BETWEEN t-T AND t SECONDS — S15

$S\_max\_t < S\_max\_sys?$ S17

No

Yes $S\_max\_t / S\_max\_def(gain\_now) < (Gain\_now-1) / Gain\_now?$ S19

No

Yes ①

MAINTAINED FOR N1 SECONDS? S21

No

Yes

Gain = Gain_now — S25

Gain = Gain_now+1 — S23

Gain = Gain_now-1 — S27

RETURN

LOAD DETECTION DEVICE AND GAIN ADJUSTMENT METHOD OF LOAD DETECTION DEVICE

CROSS-REFERENCE TO RELATED APPLICATIONS

This application is the U.S. National Phase under 35 U.S.C. § 371 of International Application No. PCT/JP2022/026039, filed on Jun. 29, 2022, the entire contents of which are hereby incorporated by reference.

TECHNICAL FIELD

The present disclosure relates to a load detection device that detects a load applied to a measurement object, based on a differential signal output from a load cell, and a gain adjustment method of the load detection device.

BACKGROUND ART

In a widely used load cell, a change in the resistance value of a strain gauge occurs by a strain generated by a load. For example, a known load cell is configured as follows. A strain gauge is incorporated in a bridge circuit, which is a conversion circuit for converting a change in the resistance value of the strain gauge due to a load into an electric signal, and the change in the resistance value is output as a differential signal. When a load is measured by using such a load cell, an amplifier for amplifying an output differential signal may be used.

For example, PTL 1 discloses a detection device capable of accurately detecting an output voltage of a bridge circuit. For example, the detection device of PTL 1 includes a bridge circuit, a power source, an instrumentation amplifier, and a physical quantity calculator. The power source applies a voltage to the bridge circuit. The instrumentation amplifier receives the output voltage of the bridge circuit from a high-impedance input terminal and amplifies and outputs the received output voltage. The physical quantity calculator receives the output voltage amplified by the instrumentation amplifier and calculates a physical quantity based on the output voltage.

CITATION LIST

Patent Literature

PTL 1: Japanese Unexamined Patent Application Publication No. 2019-39871

SUMMARY OF INVENTION

Technical Problem

However, a force detection sensor exemplified as a load cell mounted on a vehicle and provided on an axle to detect a load applied to a wheel has a wide output range (range of output). Thus, it is necessary to appropriately set a gain in accordance with an output from the load cell. For example, if the set gain is small despite a small output from the load cell, there is a possibility that the load detection accuracy decreases. On the other hand, if the set gain is large despite a large output from the load cell, a measurement range of the detection device may be exceeded.

The present disclosure has been made in view of the above-described problems. An object of the present disclosure is to provide a load detection device and a gain adjustment method of the load detection device. Even if an output range of a load cell is wide, a measurement value of the load detection device can fall within a predetermined measurement range, and a load can be accurately detected.

Solution to Problem

In order to solve the above problems, according to an aspect of the present disclosure, a load detection device is provided. The load detection device is configured to detect a load applied to a measurement object, based on a differential signal output from a load cell having a bridge circuit to which a strain gauge is connected. The load detection device includes:

an excitation-side differential amplifier circuit configured to amplify an excitation signal to be transmitted to the load cell;

a measurement-side differential amplifier circuit configured to amplify a first differential signal output from the load cell; and a control device configured to control the excitation-side differential amplifier circuit and the measurement-side differential amplifier circuit.

The control device is configured to execute a gain adjustment process of adjusting an output gain by selecting an excitation-side gain by the excitation-side differential amplifier circuit and a measurement-side gain by the measurement-side differential amplifier circuit such that a measurement value measured based on a second differential signal output from the measurement-side differential amplifier circuit falls within a predetermined range. The excitation-side gain and the measurement-side gain are selected from among candidate excitation-side gain values set at predetermined intervals as the excitation-side gain and candidate measurement-side gain values set at predetermined intervals as the measurement-side gain, respectively.

In addition, in order to solve the above problems, according to another aspect of the present disclosure, a gain adjustment method of a load detection device for adjusting a gain of the load detection device is provided. The load detection device is configured to detect a load applied to a measurement object, based on a differential signal output from a load cell having a bridge circuit to which a strain gauge is connected. The gain adjustment method includes:

amplifying, by an excitation-side differential amplifier circuit, an excitation signal to be transmitted to the load cell;

amplifying, by a measurement-side differential amplifier circuit, a first differential signal output from the load cell; and adjusting an output gain by selecting an excitation-side gain by the excitation-side differential amplifier circuit and a measurement-side gain by the measurement-side differential amplifier circuit such that a measurement value measured based on a second differential signal output from the measurement-side differential amplifier circuit falls within a predetermined range. The excitation-side gain and the measurement-side gain are selected from among candidate excitation-side gain values set at predetermined intervals as the excitation-side gain and candidate measurement-side gain values set at predetermined intervals as the measurement-side gain, respectively.

Advantageous Effects of Invention

As described above, according to the present disclosure, even if the output range of the load cell is wide, the measurement value of the load detection device can fall within the predetermined measurement range, and the load can be accurately detected.

BRIEF DESCRIPTION OF DRAWINGS

FIG. 6 is a flowchart illustrating a gain feedback adjustment process by the gain adjustment method of the load detection device according to the embodiment.

DESCRIPTION OF EMBODIMENTS

Figures 1, 2:
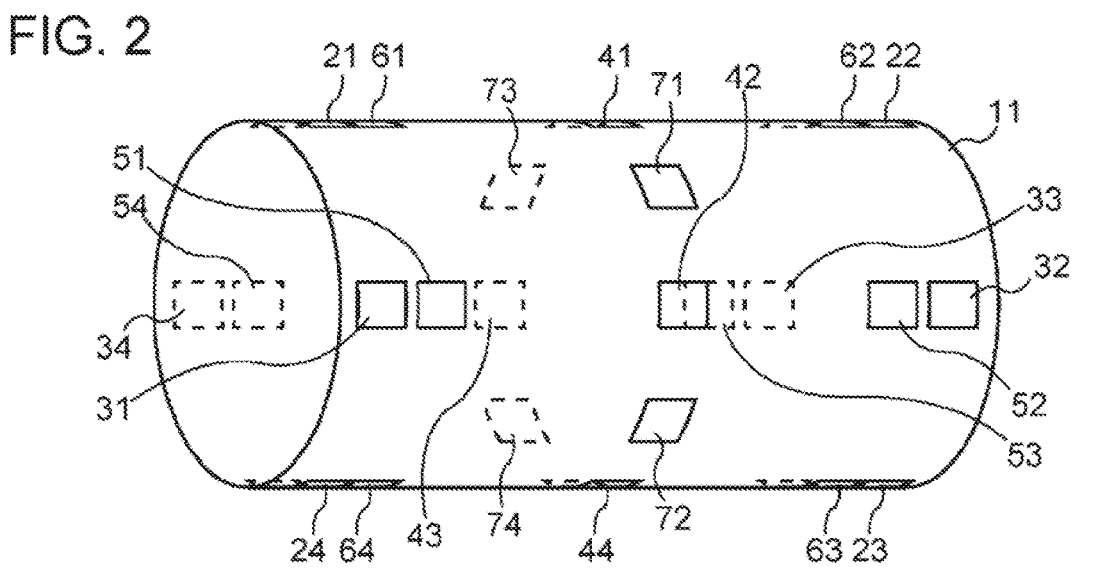
FIG. 1 is a cross-sectional view illustrating a configuration example of a load cell (six-component force detector).
FIG. 2 is a schematic diagram illustrating an arrangement of strain gauges in the load cell.

Hereinafter, a preferred embodiment of the disclosure will be described in detail with reference to the accompanying drawings. In the specification and the drawings, components having substantially the same function and configuration are denoted by the same reference numerals, and redundant description thereof will be omitted.

1. Summary of Embodiment of Present Disclosure

1-1. Detailed Description of Background of Present Disclosure

First, a background to the creation of the technology of the present disclosure will be described. Note that the background described below merely illustrates one aspect of the configuration of a load cell to which the technology of the present disclosure can be applied. The load cell to which the present disclosure can be applied is not limited to the load cell having the configuration exemplified below.

As loads applied to a wheel of a vehicle such as an automobile, a known six-component force detector detects loads (Fx, Fy, and Fz) applied in a longitudinal direction (hereafter also referred to as "x-axis direction") of the vehicle, a vehicle width direction (hereafter also referred to as "y-axis direction"), and a height direction (hereafter also referred to as "z-axis direction"). The six-component force detector also detects moments (Mx, My, and Mz) around the x-axis, the y-axis, and the z-axis, respectively. In such a six-component force detector, the sensitivity of a strain gauge tends to vary depending on the direction of a component force.

In addition, since the maximum value of the load applied to the wheel may be large, a strain gauge having a large output is used in the above six-component force detector. Therefore, the output range of the six-component force detector is wide, and may exceed a measurement range of a load detection device. In order to cope with this, it is necessary to reduce a gain for amplifying the output of the load cell. However, in a case where the gain is simply set to a small gain, the measurement accuracy is reduced if the output from the six-component force detector is small. In contrast, in a case where the gain is set to a large gain in accordance with a case where the output from the six-component force detector is small, if the output from the six-component force detector is large, the measurement range of the load detection device is exceeded.

In view of such a background, the technology of the present disclosure provides a load detection device, a gain adjustment method of the load detection device, and a recording medium on which a computer program is recorded. Even if an output range of a load cell is wide, the load detection device can automatically set a gain in accordance with the output of the load cell and can accurately detect a load within a measurement range of the load detection device.

1-2. Features of Embodiment of Present Disclosure (1-2-1) In the embodiment of the present disclosure,
    a load detection device configured to detect a load applied to a measurement object, based on a differential signal output from a load cell having a bridge circuit to which a strain gauge is connected includes:

an excitation-side differential amplifier circuit configured to amplify an excitation signal to be transmitted to the load cell;

a measurement-side differential amplifier circuit configured to amplify a first differential signal output from the load cell; and a control device configured to control the excitation-side differential amplifier circuit and the measurement-side differential amplifier circuit, in which the control device is configured to execute a gain adjustment process of adjusting an output gain by adjusting one or more of an excitation-side gain by the excitation-side differential amplifier circuit and a measurement-side gain by the measurement-side differential amplifier circuit such that a measurement value measured based on a second differential signal output from the measurement-side differential amplifier circuit falls within a predetermined range.

Note that the embodiment of the present disclosure can also be implemented as a gain adjustment method of a load detection device for automatically setting a gain in accordance with the output of the load cell. The embodiment of the present disclosure can also be implemented as a computer program for causing a control device to execute such a gain adjustment process, and a recording medium on which the computer program is recorded.

According to this configuration, it is possible to decrease the output gain if the measurement value obtained by the load detection device increases, and to increase the output gain if the measurement value obtained by the load detection device decreases. It is possible to automatically adjust the output gain without adjustment by a user or the like. For example, by adjusting the output gain by adjusting one or both of the excitation-side gain and the measurement-side gain, it is possible to adjust the resolution of the load to be measured while adjusting the measurement value within the predetermined range. Therefore, even if the load cell having a wide output range is used, the load detection accuracy can be increased.

The "excitation-side gain" refers to a gain by the excitation-side differential amplifier circuit, and the "measurement-side gain" refers to a gain by the measurement-side differential amplifier circuit. The "output gain" is a total gain obtained by multiplying the "excitation-side gain" by the "measurement-side gain".

Herein, the values of the excitation-side gain and the measurement-side gain set by the control device are referred to as an "excitation-side gain setting value" and a "measurement-side gain setting value", respectively. In addition, a total gain obtained by multiplying the "excitation-side gain setting value" by the "measurement-side gain setting value" is referred to as an "output gain setting value".

Furthermore, the "excitation signal", the "first differential signal", and the "second differential signal" each indicate a voltage signal, and the "measurement value" indicates a voltage value.

(1-2-2) In addition, in the embodiment of the present disclosure, the control device may, in the gain adjustment process, select the excitation-side gain and the measurement-side gain from among candidate excitation-side gain values set at predetermined intervals as the excitation-side gain and candidate measurement-side gain values set at predetermined intervals as the measurement-side gain, respectively, and set the output gain.

With this configuration, the output gain for amplifying the output from the bridge circuit is set by a combination of the candidate excitation-side gain value and the candidate measurement-side gain value, which are set in advance. In addition, and a load of the control device for adjusting the output gain can be reduced. Furthermore, by adjusting each of the excitation-side gain and the measurement-side gain, the output gain can be adjusted while maintaining a balance between the range of the measurement value and the resolution of the load to be measured.

The "candidate excitation-side gain value" indicates a candidate for a setting value of the excitation-side gain set in advance, and the "candidate measurement-side gain value" indicates a candidate for a setting value of the measurement-side gain set in advance. In addition, a "candidate output gain value" is a total gain value obtained by multiplying the "candidate excitation-side gain value" by the "candidate measurement-side gain value".

(1-2-3) In addition, in the embodiment of the present disclosure, the load detection device is a device configured to detect component forces acting on one of tires of a vehicle, and the control device may, in the gain adjustment process, in a case where the vehicle is in a traveling state within a predetermined period before a current time, and a maximum measurement value that is a maximum value of the measurement value within the predetermined period is less than a predetermined measurable maximum value that is measurable by the load detection device, determine whether a first ratio is smaller than a second ratio, the first ratio being a ratio of the maximum measurement value to an allowable maximum measurement value up to which it is possible to ensure the measurement value and which is determined in accordance with the output gain that is currently set, the second ratio being a ratio of the output gain that is one level smaller to the output gain that is currently set, and increase the output gain in a case where a state in which the first ratio is smaller than the second ratio continues for a predetermined first time or more.

With this configuration, since the output gain is increased in a case where a state in which the most recent maximum measurement value does not exceed the allowable maximum measurement value continues for the predetermined first time or more even if the output gain is increased, it is possible to reduce a possibility that the measurement value exceeds the allowable maximum measurement value. Thus, the output from the bridge circuit is amplified within a range in which the measurement value does not exceed the allowable maximum measurement value, and the load detection accuracy can be increased.

Note that the "measurable maximum value" indicates the maximum value of the measurement value up to which the measurement accuracy can be ensured and which is determined from the characteristics of devices and elements provided in the load detection device. In addition, the "allowable maximum measurement value" indicates the maximum value of the measurement value determined as appropriate in accordance with the set output gain.

(1-2-4) In addition, in the embodiment of the present disclosure, the control device may, even before the state in which the first ratio is smaller than the second ratio continues for the predetermined first time or more, increase the output gain in a case where the vehicle is in a deceleration state and one or both of a value obtained by multiplying an acceleration acting on the vehicle in a predetermined direction by a weight of the vehicle and a value of a sum of component forces acting on the respective tires in the predetermined direction are continuously less than a first threshold value based on a gravitational acceleration for the predetermined period.

With this configuration, even before the state in which the most recent maximum measurement value does not exceed the allowable maximum measurement value continues for the predetermined first time or more even if the output gain is increased, the output gain can be quickly increased. The output gain is increased if it is possible to determine from the traveling state of the vehicle that the measurement value does not exceed the allowable maximum measurement value. Thus, the output from the bridge circuit is amplified within the range in which the measurement value does not exceed the allowable maximum measurement value, and the load detection accuracy can be increased.

The "first threshold value based on the gravitational acceleration" is a value obtained by multiplying the gravitational acceleration by a coefficient that is set as appropriate, and is a calculated value simply indicating that the vehicle is not traveling in a manner that the tires are close to the limits in terms of vehicle dynamics. For example, if a friction coefficient between the tires and the road surface can be estimated or the road surface state can be estimated in advance, the limit at which the vehicle slips can be estimated from moment to moment. However, by dynamically calculating the coefficient, based on the load (N) at that time, the limit at which the vehicle slips can be estimated.

(1-2-5) In addition, in the embodiment of the present disclosure, the control device may, even before the state in which the first ratio is smaller than the second ratio continues for the predetermined first time or more, increase the output gain in a case where the vehicle is in the deceleration state and one or both of a value obtained by multiplying a sum of a lateral acceleration acting on the vehicle in a vehicle width direction and a centrifugal acceleration by the weight of the vehicle and a value of a sum of component forces acting on the respective tires in the vehicle width direction are continuously less than the first threshold value for the predetermined period.

With this configuration, the output gain can be quickly increased in a traveling state in which the lateral acceleration is generated to the vehicle.

(1-2-6) In addition, in the embodiment of the present disclosure, the control device may, even before the state in which the first ratio is smaller than the second ratio continues for the predetermined first time or more, increase the output gain in a case where the the vehicle is in the deceleration state while the vehicle is traveling straight and one or both of a value obtained by multiplying an absolute value of a longitudinal acceleration acting on the vehicle in a longitudinal direction by the weight of the vehicle and a value of a sum of component forces acting on the respective tires in the longitudinal direction are continuously less than the first threshold value for the predetermined period.

With this configuration, the output gain can be quickly increased in a traveling state in which the longitudinal acceleration is generated to the vehicle.

(1-2-7) In addition, in the embodiment of the present disclosure, the control device may, in the gain adjustment process, decrease the output gain in a case where the vehicle is in the traveling state within the predetermined period and the maximum measurement value within the predetermined period is the predetermined measurable maximum value or more.

With this configuration, since the output gain is decreased in a case where the most recent maximum measurement value is the allowable maximum measurement value or more, it is possible to maintain the large output gain while there is a low possibility that the measurement value exceeds the allowable maximum measurement value, and to increase the load detection accuracy.

(1-2-8) In addition, in the embodiment of the present disclosure, the control device may, in the gain adjustment process, decrease the output gain in a case where one or both of a value obtained by multiplying an acceleration acting on the vehicle in a predetermined direction by a weight of the vehicle and a value of a sum of component forces acting on the respective tires in the predetermined direction continuously exceed a second threshold value based on a gravitational acceleration for the predetermined period.

With this configuration, if it can be determined from the traveling state of the vehicle that there is a high possibility that the measurement value exceeds the allowable maximum measurement value, the output gain can be quickly decreased. Thus, the output gain is adjusted such that the measurement value does not exceed the allowable maximum measurement value, and the load detection accuracy can be increased.

The "second threshold value based on the gravitational acceleration" is a value obtained by multiplying the gravitational acceleration by a coefficient that is set as appropriate, and is a calculated value simply indicating that the vehicle is traveling in a manner that the tires are close to the limits in terms of vehicle dynamics. For example, if a friction coefficient between the tires and the road surface can be estimated or the road surface state can be estimated in advance, the limit at which the vehicle slips can be estimated from moment to moment. However, by dynamically calculating the coefficient, based on the load (N) at that time, the limit at which the vehicle slips can be estimated.

(1-2-9) In addition, in the embodiment of the present disclosure, the control device may, decrease the output gain in a case where the vehicle is in an acceleration state and one or both of a value obtained by multiplying a sum of a lateral acceleration acting on the vehicle in a vehicle width direction and a centrifugal acceleration by the weight of the vehicle and a value of a sum of component forces acting on the respective tires in the vehicle width direction continuously exceed the second threshold value for the predetermined period.

With this configuration, the output gain can be quickly decreased in the traveling state in which the lateral acceleration is generated to the vehicle.

(1-2-10) In addition, in the embodiment of the present disclosure, the control device may, decrease the output gain in a case where the vehicle is continuously traveling straight and one or both of a value obtained by multiplying an absolute value of a longitudinal acceleration acting on the vehicle in a longitudinal direction by the weight of the vehicle and a value of a sum of component forces acting on the respective tires in the longitudinal direction continuously exceed the second threshold value for the predetermined period.

With this configuration, the output gain can be quickly decreased in the traveling state in which the longitudinal acceleration is generated to the vehicle.

(1-2-11) In addition, in the embodiment of the present disclosure, the control device may, in the gain adjustment process, determine whether it is possible to increase the excitation-side gain, and in a case where it is possible to increase the excitation-side gain, preferentially increase the excitation-side gain over the measurement-side gain.

With this configuration, the output of the bridge circuit can be amplified without reducing the resolution of the load to be measured. Thus, the output of the bridge circuit can be increased without reducing the load detection accuracy.

(1-2-12) In addition, in the embodiment of the present disclosure, the control device may, determine whether no load is applied to the strain gauge and whether an appropriate posture is maintained, and in a case where no load is applied to the strain gauge and the appropriate posture is maintained, execute a zero point offset process of the measurement value.

With this configuration, if the control device determines that no load is applied to the strain gauge, the zero point offset process of the measurement value is automatically executed, and the load detection accuracy can be further increased.

2. Details of Embodiment of Present Disclosure

2-1. Configuration Example of Load Cell (Six-Component Force Detector)

Next, a configuration example of a load cell to which a load detection device according to the embodiment of the present disclosure can be applied will be described.

An example will be described in the embodiment. In the example, the technology of the present disclosure is applied to a six-component force detector capable of detecting six component forces (Fx, Fy, Fz, Mx, My, and Mz) applied to a wheel of a vehicle as an aspect of the load cell. The load cell according to the embodiment is the six-component force detector that detects six component forces applied to the wheel. The load cell is incorporated in a hub bearing unit that is attached to a suspension device and rotatably supports the wheel of the vehicle such as an automobile.

FIG. 1 is a cross-sectional view of the hub bearing unit including the six-component force detector taken along a plane including an axle. In FIG. 1, the right side indicates the outer side in the vehicle width direction, and the left side indicates the inner side in the vehicle width direction. Note that the configuration of the hub bearing unit illustrated in FIG. 1 is merely an example, and is not limited to the configuration illustrated in FIG. 1.

A hub bearing unit 100 includes a hub 110, an outer cylinder 120, an inner cylinder 130, a rolling element 140, a base 150, and a six-component force detector 1. The hub 110 is a member to which a rim disc of a wheel (not illustrated) including a rim and a tire is fastened. The hub 110 is configured by permanently affixing a cylinder 111, a flange 112, a collar 113, and the like.

The cylinder 111 is formed in a cylindrical shape concentric with the rotation central axis (axle) of the wheel. The cylinder 111 is inserted into the inside diameter side of the inner cylinder 130, a sensing unit 10, and the base 150. A spline hole 111a into which a spline shaft of a drive shaft (not illustrated) is to be fitted is formed in a region on the outer side in the vehicle width direction of the inner peripheral surface of the cylinder 111. The flange 112 has a disc shape and is formed so as to protrude in a handguard shape from an end on the outer side in the vehicle width direction of the cylinder 111 toward the outside diameter side. A surface on the outer side in the vehicle width direction of the flange 112 functions as a base to which the rim disc is to be fastened. In the flange 112, for example, about five openings 112a into which hub bolts are to be inserted are formed at equal intervals in the circumferential direction on a predetermined pitch circle diameter. The collar 113 has a cylindrical shape that protrudes from the surface on the outer side in the vehicle width direction of the flange 112 and is concentric with the axle. The collar 113 is fitted into a center bore, which is a circular opening formed in the center of the rim disc, and improves the mounting accuracy of the wheel.

The outer cylinder 120, the inner cylinder 130, and the rolling element 140 form a rolling bearing (hub bearing) that rotatably supports the wheel in collaboration with one another. The outer cylinder 120 is configured by permanently affixing a cylinder 121, a flange 122, and the like. The cylinder 121 has a cylindrical shape concentric with the axle. A raceway surface for guiding the rolling element 140 is formed on the inner peripheral surface of the cylinder 121. An end on the inner side in the vehicle width direction of the cylinder 121 is formed so as to protrude toward the inner side in the vehicle width direction with respect to an end on the inner side in the vehicle width direction of a cylinder 131 of the inner cylinder 130.

The flange 122 is formed so as to protrude in a handguard shape from an end on the outer side in the vehicle width direction of the cylinder 121 toward the outside diameter side. The flange 112 of the hub 110 is fastened and fixed to the flange 122. A surface on the outer side in the vehicle width direction of the flange 122 abuts against a surface on the inner side in the vehicle width direction of the flange 112 of the hub 110. The flange 122 has screw holes 122a formed concentrically with the openings 112a of the hub 110. A hub bolt (not illustrated) used for fixing the wheel is to be fastened to the screw holes 122a.

The inner cylinder 130 is configured by permanently affixing the cylinder 131, a flange 132, and the like. The cylinder 131 is a cylindrical member concentric with the axle, and is inserted into the inside diameter side of the cylinder 121 of the outer cylinder 120. A predetermined interval is provided between the outer peripheral surface of the cylinder 131 and the inner peripheral surface of the cylinder 121 of the outer cylinder 120. The raceway surface for guiding the rolling element 140 is formed on the outer peripheral surface of the cylinder 131. The flange 132 is formed so as to protrude from an end on the outer side in the vehicle width direction of the cylinder 131 toward the inside diameter side. The flange 132 holds an end on the outer side in the vehicle width direction of a first flange 12 of the sensing unit 10. The rolling element 140 is a bearing incorporated between the raceway surfaces of the outer cylinder 120 and the inner cylinder 130. The rolling element 140 is incorporated between the outer cylinder 120 and the inner cylinder 130 together with a cage 141 and a cage 142 for positioning the rolling element 140 between the outer cylinder 120 and the inner cylinder 130.

The base 150 fastens and fixes the hub bearing unit 100 to an upright (hub knuckle) (not illustrated) of the suspension device. The base 150 is configured by permanently affixing a cylinder 151, a flange 152, a recess 153, a protrusion 154, and the like. The cylinder 151 is a cylindrical member concentric with the axle, and an end on the inner side in the vehicle width direction of the cylinder 111 of the hub 110 is inserted therein. The outer peripheral surface of the cylinder 111 of the hub 110 is disposed so as to face the inner peripheral surface of the cylinder 151 with a predetermined interval interposed therebetween in the radial direction.

The flange 152 is formed so as to protrude in a handguard shape from an end on the outer side in the vehicle width direction of the cylinder 151 toward the outside diameter side. The flange 152 is a fastening surface that fastens the base 150 to the upright (not illustrated). In the flange 152, openings (not illustrated) are formed in a distributed manner in the circumferential direction, and bolts used for fastening to the upright are to be inserted into the openings. Inside the flange 152, a through-hole 152b is formed, from the inside of a space in which the outer peripheral surface of a cylinder 11 of the sensing unit 10 is disposed, to the outer peripheral edge of the flange 152. In the through-hole 152b, for example, a wiring connected to a strain gauge is disposed.

The recess 153 is formed by stepwise expanding the inside diameter of a region corresponding to the flange 152 in the axial direction in the inner peripheral surface of the base 150. The recess 153 holds a second flange 13 of the sensing unit 10. The protrusion 154 has a cylindrical shape formed so as to protrude from an intermediate portion of the flange 152 in the radial direction toward the outer side of the vehicle width direction. The outer peripheral surface of the protrusion 154 is disposed so as to face the inner peripheral surface at an end on the inner side in the vehicle width direction of the cylinder 121 of the outer cylinder 120, with an interval interposed therebetween in the radial direction.

The six-component force detector 1 is a load cell capable of detecting loads in three orthogonal axis directions and moments around the three orthogonal axes acting on the wheel. The six-component force detector 1 includes the substantially cylindrical sensing unit 10, strain gauges provided on the sensing unit 10, and a bridge circuit including the strain gauges.

The sensing unit (sensor core) 10 includes the cylinder 11, the first flange 12, the second flange 13, and the like. The cylinder 11 is formed in a cylindrical shape in which the inside diameter and the outside diameter are substantially constant over a predetermined length in the axial direction, and strain gauges described later are attached (adhered) to the cylinder 11. The first flange 12 is provided at an end on the outer side in the vehicle width direction of the cylinder 11 and is formed so as to protrude toward the outside diameter side and the inside diameter side with respect to the cylinder 11. The first flange 12 is fixed to the inner cylinder 130 in a state in which the outer peripheral surface abuts against the inner peripheral surface in the vicinity of an end on the outer side in the vehicle width direction of the cylinder 131 of the inner cylinder 130, and an end surface abuts against a surface on the inner side in the vehicle width direction of the flange 132.

The second flange 13 is provided at an end on the inner side in the vehicle width direction of the cylinder 11, and is formed so as to protrude toward the outside diameter side and the inside diameter side with respect to the cylinder 11. The second flange 13 is fixed to the base 150 in a state in which the outer peripheral surface and an end surface thereof are fitted into the recess 153 of the base 150. With such a configuration, substantially all of the forces acting on the wheel are transmitted to and from the base 150 via the sensing unit 10.

The six-component force detector 1 includes an Fx detection system, an Fy detection system, an Fz detection system, an Mx detection system, an My detection system, and an Mz detection system each having a bridge circuit including the strain gauges provided on the cylinder 11 of the sensing unit 10 described above. The Fx detection system detects a force Fx acting on the cylinder 11 of the sensing unit 10 in the radial direction (x-axis direction). The Fz detection system detects a force Fz acting on the cylinder 11 of the sensing unit 10 in the radial direction (z-axis direction) orthogonal to the x-axis direction. The Fy detection system detects a force Fy acting on the cylinder 11 of the sensing unit 10 in the axial direction (y-axis direction). The Mx detection system detects a moment Mx around the x-axis acting on the cylinder 11 of the sensing unit 10. The Mz detection system detects a moment Mz around the z-axis acting on the cylinder 11 of the sensing unit 10. The My detection system detects a moment My around the y-axis acting on the cylinder 11 of the sensing unit 10.

Figure 3:
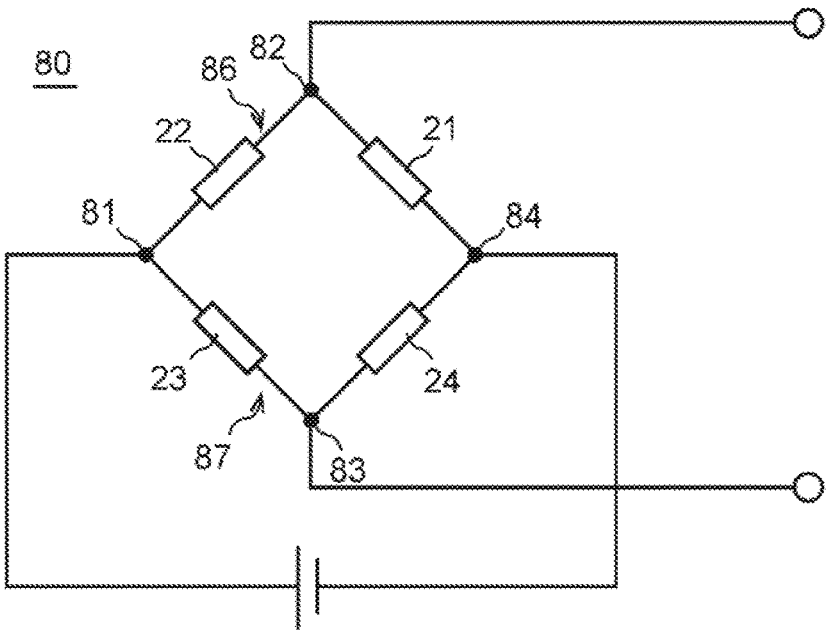
FIG. 3 is an explanatory diagram illustrating a configuration example of a bridge circuit of the load cell.

Each of the above-described Fx detection system, Fy detection system, Fz detection system, Mx detection system, My detection system, and Mz detection system has the bridge circuit including four strain gauges. FIG. 2 is a schematic diagram illustrating an arrangement of the strain gauges in the six-component force detector 1. FIG. 3 is a diagram illustrating the arrangement of the strain gauges of the Fx detection system and the configuration of the bridge circuit in the six-component force detector 1. FIG. 3 illustrates a representative example of the arrangement of the strain gauges of each force detection system (the Fx detection system, the Fy detection system, and the Fz detection system) and each moment detection system (the Mx detection system, the My detection system, and the Mz detection system) and the configuration of the bridge circuit.

As illustrated in FIGS. 2 and 3, the Fx detection system includes strain gauges 21 to 24. The strain gauges 21 to 24 are single-axis strain gauges. The strain gauges 21 to 24 are attached to the outer peripheral surface of the cylinder 11 such that the detection directions thereof are parallel with the central axis direction of the cylinder 11. The strain gauge 21 is disposed in a region on the first flange 12 side on the outer peripheral surface of the cylinder 11. The strain gauge 22 is disposed on a straight line that passes through the strain gauge 21 and is parallel with the axial direction of the cylinder 11, and is disposed in a region on the second flange 13 side on the outer peripheral surface of the cylinder 11. The strain gauge 23 is disposed at a position shifted by 180 degrees around the central axis of the cylinder 11 as viewed from the strain gauge 22 (position symmetrical to the strain gauge 22 with respect to the central axis of the cylinder 11). The strain gauge 24 is disposed at a position shifted by 180 degrees around the central axis of the cylinder 11 as viewed from the strain gauge 21 (position symmetrical to the strain gauge 21 with respect to the central axis of the cylinder 11).

As illustrated in FIG. 3, the bridge circuit of the Fx detection system is formed as a Wheatstone bridge circuit. In the circuit, the strain gauges 21 to 24 are sequentially connected in a loop shape. A positive electrode and a negative electrode of a power source are connected between the strain gauge 22 and the strain gauge 23 and between the strain gauge 21 and the strain gauge 24, respectively. The bridge circuit extracts a potential difference between a terminal between the strain gauge 21 and the strain gauge 22 and a terminal between the strain gauge 23 and the strain gauge 24 as an output. The configuration of the bridge circuit will be described later in detail.

The Fy detection system includes strain gauges 41 to 44. The strain gauges 41 to 44 are single-axis strain gauges. The strain gauges 41 to 44 are attached to the outer peripheral surface of the cylinder 11 such that the detection directions thereof are parallel with the central axis direction of the cylinder 11. The strain gauge 41 is disposed in the middle between the strain gauges 21 and 22 of the Fx detection system. The strain gauges 42, 43, and 44 are disposed at positions where phases around the central axis of the cylinder 11 is shifted by 90 degrees, 180 degrees, and 270 degrees with respect to the strain gauge 41, respectively. The bridge circuit of the Fy detection system has the same configuration except that the strain gauges 21 to 24 of the Fx detection system illustrated in FIG. 3 are replaced with the strain gauges 41 to 44.

The Fz detection system includes strain gauges 31 to 34. The strain gauges 31 to 34 are single-axis strain gauges. The strain gauges 31 to 34 are attached to the outer peripheral surface of the cylinder 11 such that the detection directions thereof are parallel with the central axis direction of the cylinder 11. The strain gauge 31 is disposed so as to be shifted by 90 degrees around the central axis of the cylinder 11 with respect to the strain gauge 21 of the Fx detection system. The strain gauge 32 is disposed so as to be shifted by 90 degrees around the central axis of the cylinder 11 with respect to the strain gauge 22 of the Fx detection system. The strain gauges 31 and 32 are disposed on the same straight line parallel with the axial direction of the cylinder 11. The strain gauge 33 is disposed at a position shifted by 180 degrees around the central axis of the cylinder 11 as viewed from the strain gauge 32 (position symmetrical to the strain gauge 32 with respect to the central axis of the cylinder 11). The strain gauge 34 is disposed at a position shifted by 180 degrees around the central axis of the cylinder 11 as viewed from the strain gauge 31 (position symmetrical to the strain gauge 31 with respect to the central axis of the cylinder 11). The bridge circuit of the Fz detection system has the same configuration except that the strain gauges 21 to 24 of the Fx detection system illustrated in FIG. 3 are replaced with the strain gauges 31 to 34.

The Mx detection system includes strain gauges 51 to 54. The strain gauges 51 to 54 are single-axis strain gauges. The strain gauges 51 to 54 are attached to the outer peripheral surface of the cylinder 11 such that the detection directions thereof are parallel with the central axis direction of the cylinder 11. The strain gauge 51 is disposed so as to be adjacent to the strain gauge 31 of the Fz detection system in the central axis direction of the cylinder 11. The strain gauge 52 is disposed so as to be adjacent to the strain gauge 32 of the Fz detection system in the central axis direction of the cylinder 11. The strain gauges 51 and 52 are disposed on the same straight line parallel with the axial direction of the cylinder 11. The strain gauge 53 is disposed at a position shifted by 180 degrees around the central axis of the cylinder 11 as viewed from the strain gauge 52 (position symmetrical to the strain gauge 52 with respect to the central axis of the cylinder 11). The strain gauge 54 is disposed at a position shifted by 180 degrees around the central axis of the cylinder 11 as viewed from the strain gauge 51 (position symmetrical to the strain gauge 51 with respect to the central axis of the cylinder 11). The bridge circuit of the Mx detection system has the same configuration except that the strain gauges 21 to 24 of the Fx detection system illustrated in FIG. 3 are replaced with the strain gauges 51 to 54.

The My detection system includes strain gauges 71 to 74. The strain gauges 71 to 74 are shear strain gauges. The strain gauges 71 to 74 are attached to the outer peripheral surface of the cylinder 11 such that the detection directions thereof are the circumferential direction of the cylinder 11. The strain gauge 71 is disposed in the middle between the strain gauges 41 and 42 of the Fy detection system. The strain gauge 72 is disposed in the middle between the strain gauges 42 and 44 of the Fy detection system. The strain gauges 73 and 74 are disposed at positions symmetrical to the strain gauges 72 and 71, respectively, with respect to the central axis of the cylinder 11. The bridge circuit of the My detection system has the same configuration except that the strain gauges 21 to 24 of the Fx detection system illustrated in FIG. 3 are replaced with the strain gauges 71 to 74.

The Mz detection system includes strain gauges 61 to 64. The strain gauges 61 to 64 are single-axis strain gauges. The strain gauges 61 to 64 are attached to the outer peripheral surface of the cylinder 11 such that the detection directions thereof are parallel with the central axis direction of the cylinder 11. The strain gauge 61 is disposed so as to be adjacent to the strain gauge 21 of the Fx detection system in the central axis direction of the cylinder 11. The strain gauge 62 is disposed so as to be adjacent to the strain gauge 22 of the Fx detection system in the central axis direction of the cylinder 11. The strain gauges 61 and 62 are disposed on the same straight line parallel with the axial direction of the cylinder 11. The strain gauge 63 is disposed at a position shifted by 180 degrees around the central axis of the cylinder 11 as viewed from the strain gauge 62 (position symmetrical to the strain gauge 62 with respect to the central axis of the cylinder 11). The strain gauge 64 is disposed at a position shifted by 180 degrees around the central axis of the cylinder 11 as viewed from the strain gauge 61 (position symmetrical to the strain gauge 61 with respect to the central axis of the cylinder 11). The bridge circuit of the Mz detection system has the same configuration except that the strain gauges 21 to 24 of the Fx detection system illustrated in FIG. 3 are replaced with the strain gauges 61 to 64.

2-2. Bridge Circuit

Next, taking the bridge circuit of the Fx detection system illustrated in FIG. 3 as an example, a configuration example of the bridge circuit of each force detection system and each moment detection system will be described, for example.

A bridge circuit 80 of the Fx detection system illustrated in FIG. 3 includes four terminals, which are first, second, third, and fourth terminals 81, 82, 83, and 84, and the four strain gauges 21, 22, 23, and 24. The strain gauge 22 is provided between the first terminal 81 and the second terminal 82, and the strain gauge 21 is provided between the second terminal 82 and the fourth terminal 84. The strain gauge 23 is provided between the first terminal 81 and the third terminal 83, and the strain gauge 24 is provided between the third terminal 83 and the fourth terminal 84. A current path passing through the first terminal 81, the strain gauge 21, the second terminal 82, the strain gauge 22, and the fourth terminal 84 constitutes a first path 86. A current path passing through the first terminal 81, the strain gauge 24, the third terminal 83, the strain gauge 23, and the fourth terminal 84 constitutes a second path 87.

The strain gauges 21, 22, 23, and 24 are resistor elements whose resistance value changes in accordance with the amount of strain. In this embodiment, the strain gauge includes a material having a gauge factor of four or more. For example, the strain gauge may include a Cr—N thin film. When the gauge factor of the strain gauge is four or more, it is possible to obtain an output desired as the six-component force detector 1 for detecting the load applied to the wheel. However, the strain gauge is not limited to the Cr—N thin film.

When a load is applied to a strain generating body in the bridge circuit 80, a strain is generated in each of the strain gauges 21, 22, 23, and 24, and the resistance value of each of the strain gauges 21, 22, 23, and 24 changes in accordance with the amount of strain. The bridge circuit 80 outputs a differential signal (first differential signal) corresponding to a potential difference between the second terminal 82 of the first path 86 and the third terminal 83 of the second path 87.

Note that a resistance element for adjusting the deviation of the initial balance of the resistance value of the bridge circuit 80 or a resistance element for compensating for the temperature characteristic may be connected to a given position in the bridge circuit 80.

2-3. Details of Embodiment of Load Detection Device

Next, an embodiment of the load detection device of the present embodiment will be described in detail. In the following description, the first terminal to the fourth terminal of the bridge circuit of each force detection system and each moment detection system of the load cell 1 will be described as the first terminal 81, the second terminal 82, the third terminal 83, and the fourth terminal 84 of the bridge circuit 80 illustrated in FIG. 3.

Figure 4:
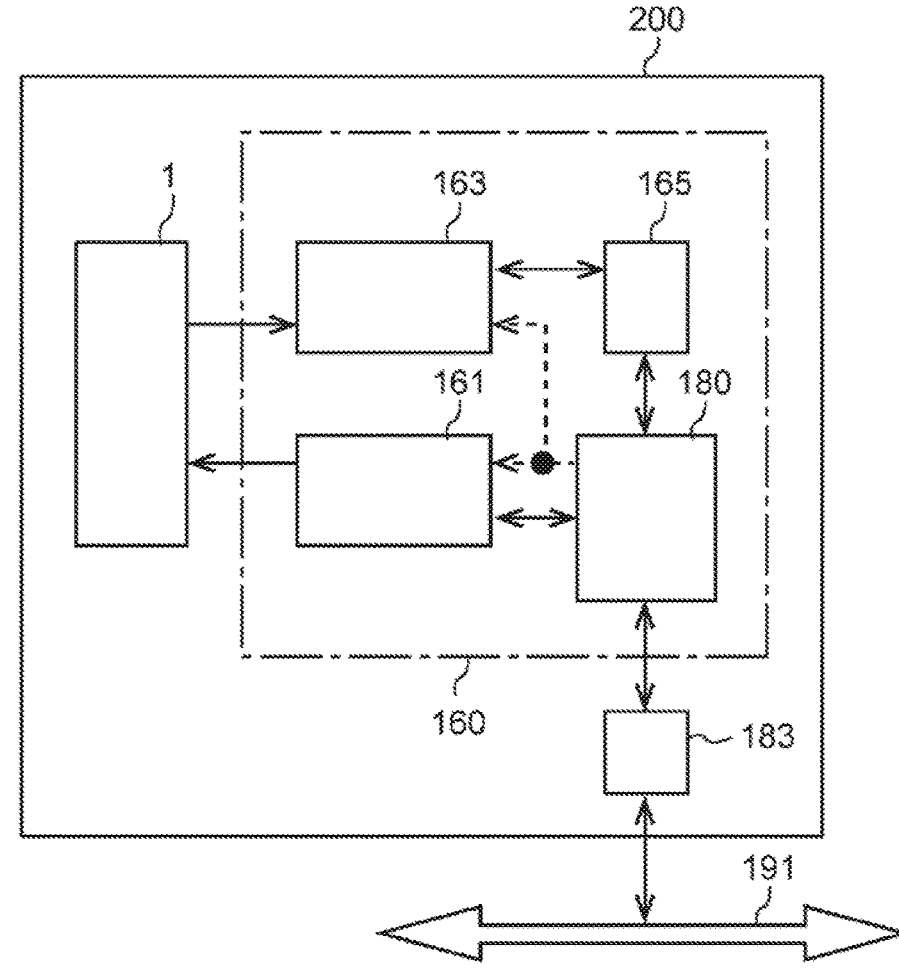
FIG. 4 is a block diagram illustrating a configuration example of a load detection device according to an embodiment of the present disclosure.

FIG. 4 is a block diagram functionally illustrating a configuration example of the load detection device of the present embodiment.

A load detection device 200 of the present embodiment includes a load cell (six-component force detector) 1, a measurement circuit 160, and a controller area network (CAN) communication driver 183. The bridge circuit 80 and the measurement circuit 160 of each force detection system and each moment detection system of the load cell 1 may be connected via a connector.

The measurement circuit 160 includes an excitation-side differential amplifier circuit 161, a measurement-side differential amplifier circuit 163, a lock-in amplifier 165, and a control device 180. The control device 180 is connected to a CAN bus 191, which is a communication bus to which control devices mounted on the vehicle are connected, via the CAN communication driver 183.

The excitation-side differential amplifier circuit 161 has a function of generating an excitation signal, amplifying the excitation signal, and transmitting the amplified signal to the load cell 1. The excitation-side differential amplifier circuit 161 includes, for example, a sine wave oscillator, a gain switching differential amplifier, an excitation driver differential amplifier, and the like which are known in the related art. The driving of the excitation-side differential amplifier circuit 161 is controlled by the control device 180. The excitation-side differential amplifier circuit 161 generates a sine wave electric signal (excitation signal) having a predetermined frequency, phase, and amplitude. The excitation-side differential amplifier circuit 161 also amplifies the excitation signal with a set gain (excitation-side gain) and transmits the excitation signal to the first terminal 81 and the fourth terminal 84 of each bridge circuit 80 of the load cell 1.

The measurement-side differential amplifier circuit 163 has a function of acquiring the first differential signal output from the load cell 1, amplifying the first differential signal, and outputting the amplified signal. The measurement-side differential amplifier circuit 163 includes, for example, a differential instrumentation amplifier, a gain switching differential amplifier, an A/D converter, and the like which are known in the related art. The driving of the measurement-side differential amplifier circuit 163 is controlled by the control device 180, and the measurement-side differential amplifier circuit 163 amplifies the acquired first differential signal with a set gain (measurement-side gain) and outputs a second differential signal to the lock-in amplifier 165.

The configuration of the excitation-side differential amplifier circuit 161 is not limited as long as the configuration can generate an excitation signal to be transmitted to the bridge circuit in accordance with a drive command from the control device 180 and amplify the excitation signal. Similarly, the configuration of the measurement-side differential amplifier circuit 163 is not limited as long as the configuration can amplify the first differential signal output from the bridge circuit in accordance with a drive command from the control device 180. In addition, one or both of the excitation-side differential amplifier circuit 161 and the measurement-side differential amplifier circuit 163 may include various elements having a function of correcting the frequency, phase, amplitude, or the like of the signal.

The lock-in amplifier 165 extracts a signal corresponding to the frequency and phase of the excitation signal from the second differential signal output from the measurement-side differential amplifier circuit 163. The extracted signal is output to the control device 180 as data indicating the measurement value. The lock-in amplifier 165 may also be configured by a lock-in amplifier known in the related art.

The control device 180 includes one or more processors and one or more memories communicably connected to the one or more processors, and executes control of the measurement circuit 160. In addition, the control device 180 calculates the load applied to the load cell 1, based on the measurement value input from the lock-in amplifier 165 and an output gain. The control device 180 outputs a command signal to the excitation-side differential amplifier circuit 161 and the measurement-side differential amplifier circuit 163. In the present embodiment, the control device 180 sets the excitation-side gain and the measurement-side gain, and adjusts the output gain such that the measurement value input from the lock-in amplifier 165 does not exceed an allowable maximum measurement value.

For example, the control device 180 executes a process (gain feedback adjustment process) of adjusting one or more of the excitation-side gain and the measurement-side gain such that the measurement value falls below the allowable maximum measurement value. The control device 180 executes the process based on the history of the measurement values input from the lock-in amplifier 165. In addition, the control device 180 acquires information on a traveling state of the vehicle via the CAN communication driver 183. The control device 180 executes a process (gain feedforward adjustment process) of adjusting the output gain, based on the acquired information on the traveling state such that the measurement value falls below the allowable maximum measurement value.

In the present embodiment, candidate gain values are set at predetermined intervals for each of the excitation-side gain and the measurement-side gain. The control device 180 determines a gain setting value for each of the excitation-side gain and the measurement-side gain and adjusts the output gain. For example, in a case where the excitation-side gain can be set up to 5 times (amplification factor 500%) and the measurement-side gain can be set up to 4 times (amplification factor 400%), the output gain can be adjusted up to 20 times (amplification factor 2,000%) at the maximum.

Since the output gain can be adjusted by the excitation-side gain and the measurement-side gain, the resolution of the load to be measured can be optimized while adjusting the measurement value to a desired range. For example, it is assumed that there is a load detection device that can perform measurement with an accuracy of 0.1 mV by calculation with a full range of 0 to 100 mV. On such an assumption, when a physical quantity of 0 to 5000 N is detected, a case where an output of 0 to 10 mV is measured and a case where an output of 0 to 100 mV is measured are compared with each other. The load can be detected in increments of 50 N in the former case, and the load can be measured in increments of 5 N in the latter case. Therefore, it is possible to adjust the resolution to a more optimal resolution while bringing the maximum value of the measurement value close to the allowable maximum measurement value corresponding to the setting value of the output gain.

For example, in a case where the gain is adjusted on the excitation side, the output of the bridge circuit is doubled by doubling the excitation-side gain. However, in a case where the excitation-side gain is doubled, the output of the bridge circuit is doubled, but the resolution of the load to be measured is not reduced. On the other hand, in a case where the gain is adjusted on the measurement side, the resolution itself of the load to be measured can be adjusted depending on whether the first differential signal is amplified twice or four times. For example, in a case where the measurement-side gain is doubled, the output of the second differential signal is doubled as compared with the first differential signal, while the resolution of the load to be measured is halved. Therefore, since the output gain can be adjusted by the excitation-side gain and the measurement-side gain, it is possible to optimize the resolution of the load to be measured while adjusting the measurement value to the desired range.

In addition, in the present embodiment, the control device 180 is configured to acquire the information on the traveling state of the vehicle via the CAN communication driver 183. The control device 180 is also configured to execute a zero point offset process of the load cell 1 if a predetermined offset process condition is satisfied. In the case of the load cell 1 mounted on the vehicle like the above-described six-component force detector, an offset amount which is a difference between a measurement value to be measured with respect to an applied load and an actual measurement value may always change due to a thermal history, a mechanical stress history, or the like. In order to prevent such an offset amount from becoming excessive, from the information on the traveling state of the vehicle, the control device 180 determines whether the offset process condition under which the zero point offset process can be executed is satisfied. If the offset process condition is satisfied, the control device 180 executes the zero point offset process. Thus, the load detection accuracy can be further increased.

2-4. Operation of Load Detection Device

Next, an example of the operation of the load detection device according to the present embodiment will be described by taking as an example a load detection device that detects component forces applied to a tire of a vehicle using the six-component force detector 1.

(2-4-1. Presetting Process)

The control device 180 executes a presetting process for setting a condition necessary for executing the gain adjustment process and the zero point offset process. Basically, the presetting process may be executed before the load detection device 200 is used for the first time, but may be executed again when repair, inspection, or replacement work of the load cell 1 or the measurement circuit 160 is performed.

Figure 5:
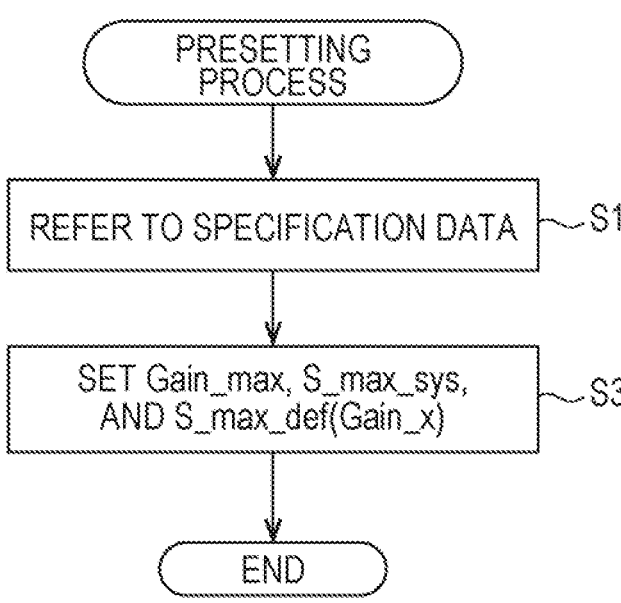
FIG. 5 is a flowchart illustrating a presetting process by a gain adjustment method of the load detection device according to the embodiment.

FIG. 5 is a flowchart illustrating the presetting process.

In the presetting process, the control device 180 refers to data indicating specifications of the load detection device 200 (step S1). Subsequently, the control device 180 sets an output gain maximum value Gain_max, a measurable maximum value S_max_sys, and an allowable maximum measurement value S_max_def (gain_x), based on specifications of the respective elements constituting the measurement circuit 160 (step S3). The specification data may be a data sheet also referred to as a transducer electronic data sheet (TEDS).

Settable values of the excitation-side gain and the measurement-side gain (candidate excitation-side gain values and candidate measurement-side gain values) are set in advance at predetermined intervals. The control device 180 calculates and records the settable output gain maximum value Gain_max. The control device 180 also reads and records data of the maximum value (measurable maximum value) S_max_sys, which is measurable by the measurement circuit 160. The control device 180 also reads and records data of the allowable maximum measurement value S_max_def (gain_x), which is the maximum value of the measurement value up to which the measurement circuit 160 ensures the measurement accuracy in accordance with an output gain Gain.

(2-4-2. Gain Feedback Adjustment Process)

FIG. 6 is a flowchart illustrating a gain adjustment process (gain feedback adjustment process) based on the history of measurement values. The gain feedback adjustment process may be constantly executed during activation of a system of the vehicle, or may be configured to be executed during execution of specific control using the component forces applied to the tires.

First, the control device 180 acquires vehicle state information via the CAN communication driver 183 (step S11). The vehicle state information includes information that can be used to determine whether the vehicle is traveling and the acceleration/deceleration and yaw rate of the vehicle. The vehicle state information may include information on a vehicle speed, the acceleration/deceleration, an accelerator operation amount, and a brake operation amount, but is not limited to these pieces of information. For example, the vehicle state information may include status information indicating that the vehicle is traveling.

Subsequently, based on the vehicle state information, the control device 180 determines whether the vehicle is in a traveling state between a time that is T seconds before a current time t and the current time t (step S13). For example, the control device 180 determines that the vehicle is in the traveling state between the time that is T seconds before the current time t and the current time t if one or more of the following conditions are satisfied during the period. The conditions include that the vehicle speed is a positive value exceeding 0 km/h, that the acceleration/deceleration is not zero, and the accelerator operation amount is a positive value. The value of T seconds may be set as appropriate within a range of, for example, 5 to 20 seconds.

If the vehicle is not in the traveling state between the time that is T seconds before the current time t and the current time t (S13/No), the control device 180 maintains the output gain Gain at a current output gain setting value Gain_now (step S25). For example, the control device 180 maintains the excitation-side gain and the measurement-side gain at a current excitation-side gain setting value and a current measurement-side gain setting value, respectively. In this case, since the vehicle is in a stopped state and there is no change in the component forces, which are applied to the tires as a result of traveling of the vehicle, the process of this routine is ended without adjusting the output gain Gain, and returns to step S11.

On the other hand, if the vehicle is in the traveling state between the time that is T seconds before the current time t and the current time t (S13/Yes), the following process is performed. The control device 180 acquires a maximum measurement value S_max_t between the time that is T seconds before the current time t and the current time t (t-T to t) (step S15). That is, the control device 180 acquires the maximum value (maximum measurement value) S_max_t of a measurement value S measured in a predetermined period that has already elapsed.

Subsequently, the control device 180 determines whether the acquired maximum measurement value S_max_t is less than the measurable maximum value S_max_sys (step S17). That is, the control device 180 determines whether the maximum measurement value S_max_t measured in the predetermined period in which the vehicle is in the traveling state is less than the measurable maximum value S_max_sys. If the maximum measurement value S_max_t is the measurable maximum value S_max_sys or more (S17/No), the following process is performed. The control device 180 sets the output gain Gain to a value Gain_now−1 that is one level smaller than the current output gain setting value Gain_now (step S27).

For example, the control device 180 decreases one of the excitation-side gain and the measurement-side gain by one level to decrease the output gain Gain. As a result, the measured maximum measurement value S_max_t can be brought closer to the measurable maximum value S_max_sys. In addition, the possibility that the measurement value S measured if a similar traveling state is continued exceeds the measurable maximum value S_max_sys can be reduced. For example, by maintaining the excitation-side gain and reducing the measurement-side gain, it is possible to increase the resolution of the load to be measured while reducing the range of the measurement value S.

On the other hand, if the maximum measurement value S_max_t is less than the measurable maximum value S_max_sys (S17/Yes), the following process is performed. The control device 180 determines whether a first ratio is smaller than a second ratio (step S19). The first ratio is a ratio of the maximum measurement value S_max_t to the allowable maximum measurement value S_max_def (gain now) determined according to the currently set output gain Gain. The second ratio is a ratio of the output gain Gain_now−1 one level smaller to the currently set output gain Gain_now. In step S19, it is determined whether the measured maximum measurement value S_max_t does not exceed the allowable maximum measurement value S_max_def (gain_now) even if the output gain is increased by one level. That is, it is determined whether there is a margin for increasing the output gain by one level. For the purpose of setting this margin as a design value, the setting value allowable maximum measurement value S_max_def (gain_x) of each output gain Gain is set in advance.

Note that the gain feedforward adjustment process based on the vehicle state information, which will be described later, is performed for each vehicle. However, the comparison between the maximum measurement value S_max_t and the allowable maximum measurement value S_max_def (gain_x) is performed for each component force component of the vehicle.

If a negative determination is made in step S19 (S19/No), the control device 180 maintains the output gain Gain at the current output gain setting value Gain_now (step S25). In this case, there is a possibility that the measurement value S exceeds the allowable maximum measurement value S_max_def (gain_x) corresponding to the output gain if the output gain Gain is increased. Thus, the process of this routine is ended without adjusting the output gain Gain, and returns to step S11.

On the other hand, if a positive determination is made in step S19 (S19/Yes), the control device 180 determines whether the state satisfying the condition in step S19 is maintained for a first time N1 (seconds) (step S21). The first time N1 may be set to a given time at which stable continuation of a state in which there is a margin for increasing the output gain by one level can be determined. Note that the information indicating that the condition in step S19 is satisfied is used in the gain feedforward adjustment process described later. Therefore, a flag indicating that the condition in step S19 is satisfied is set, for example, so that it can be referred to.

If the state satisfying the condition in step S19 is not maintained for the first time N1 (S21/No), the control device 180 maintains the output gain Gain at the current output gain setting value Gain_now (step S25). In this case, it is not possible to determine that there is no possibility that the measurement value S exceeds the allowable maximum measurement value S_max_def (gain_x) corresponding to the output gain even if the output gain Gain is increased. Thus, the process of this routine is ended without adjusting the output gain Gain, and returns to step S11.

On the other hand, if the state satisfying the condition in step S19 is maintained for the first time N1 (S21/Yes), the control device 180 sets the setting of the output gain Gain to a value Gain_now+1 (step S23). The value Gain_now+1 is greater than the current output gain setting value Gain_now by one level.

For example, the control device 180 increases one of the excitation-side gain and the measurement-side gain by one level to increase the output gain Gain. Thus, the measurement value S can be increased so as not to exceed the allowable maximum measurement value S_max_def (gain_x) corresponding to the adjusted output gain (Gain_now+1). At this time, the excitation-side gain may be preferentially increased.

Figure 7:
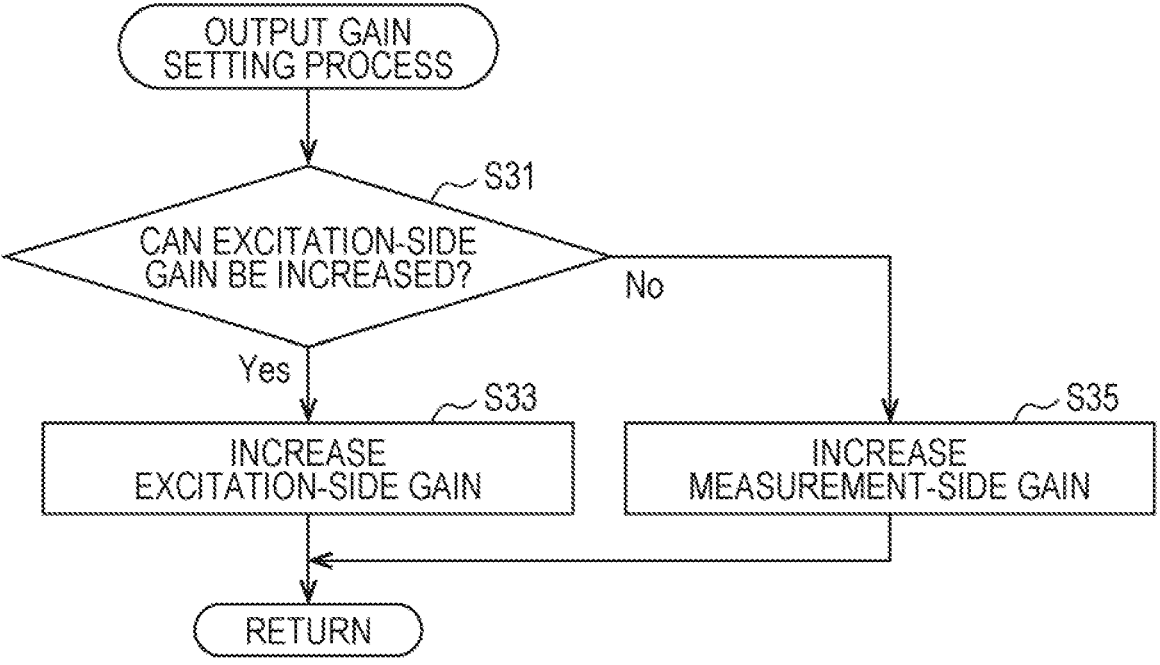
FIG. 7 is a flowchart illustrating a setting process of an excitation-side gain and a measurement-side gain by the gain adjustment method of the load detection device according to the embodiment.

FIG. 7 is a flowchart illustrating a process of setting the excitation-side gain and the measurement-side gain to increase the output gain Gain.

The control device 180 reads the currently set excitation-side gain setting value and determines whether the excitation-side gain can be increased (step S31). For example, the control device 180 determines whether the currently set excitation-side gain setting value is the maximum value of the candidate excitation-side gain values set in advance at predetermined intervals. If the excitation-side gain setting value is not the maximum value of the candidate excitation-side gain values, the control device 180 determines that the excitation-side gain can be increased.

If it is determined that the excitation-side gain can be increased (S31/Yes), the control device 180 preferentially increases the excitation-side gain to increase the output gain Gain (step S33). On the other hand, if it is not determined that the excitation-side gain can be increased (S31/No), the control device 180 increases the output gain Gain by increasing the measurement-side gain (step S35). In this way, by preferentially increasing the excitation-side gain, the measurement value S can be increased without reducing the resolution of the load to be measured.

The control device 180 repeatedly executes the process of each step described above at a predetermined sampling period. Even if the output range from the bridge circuit of the load cell 1 is wide, the control device 180 sets the output gain Gain, based on the history of the actual measurement values S. The output gain Gain is set such that the measured maximum measurement value S_max_t is less than the measurable maximum value S_max_sys and the allowable maximum measurement value S_max_def (gain_now). Thus, the output of the bridge circuit is amplified such that the measurement value S does not exceed the measurable maximum value S_max_sys and the allowable maximum measurement value S_max_def (gain_x), and the measurement accuracy of the load can be increased.

(2-4-3. Modification of Gain Feedback Adjustment Process)

In the gain feedback adjustment process according to a modification, a method of setting the output gain Gain when increasing the output gain Gain is different from that in the example of the gain feedback adjustment process illustrated in FIG. 6.

Figure 8:
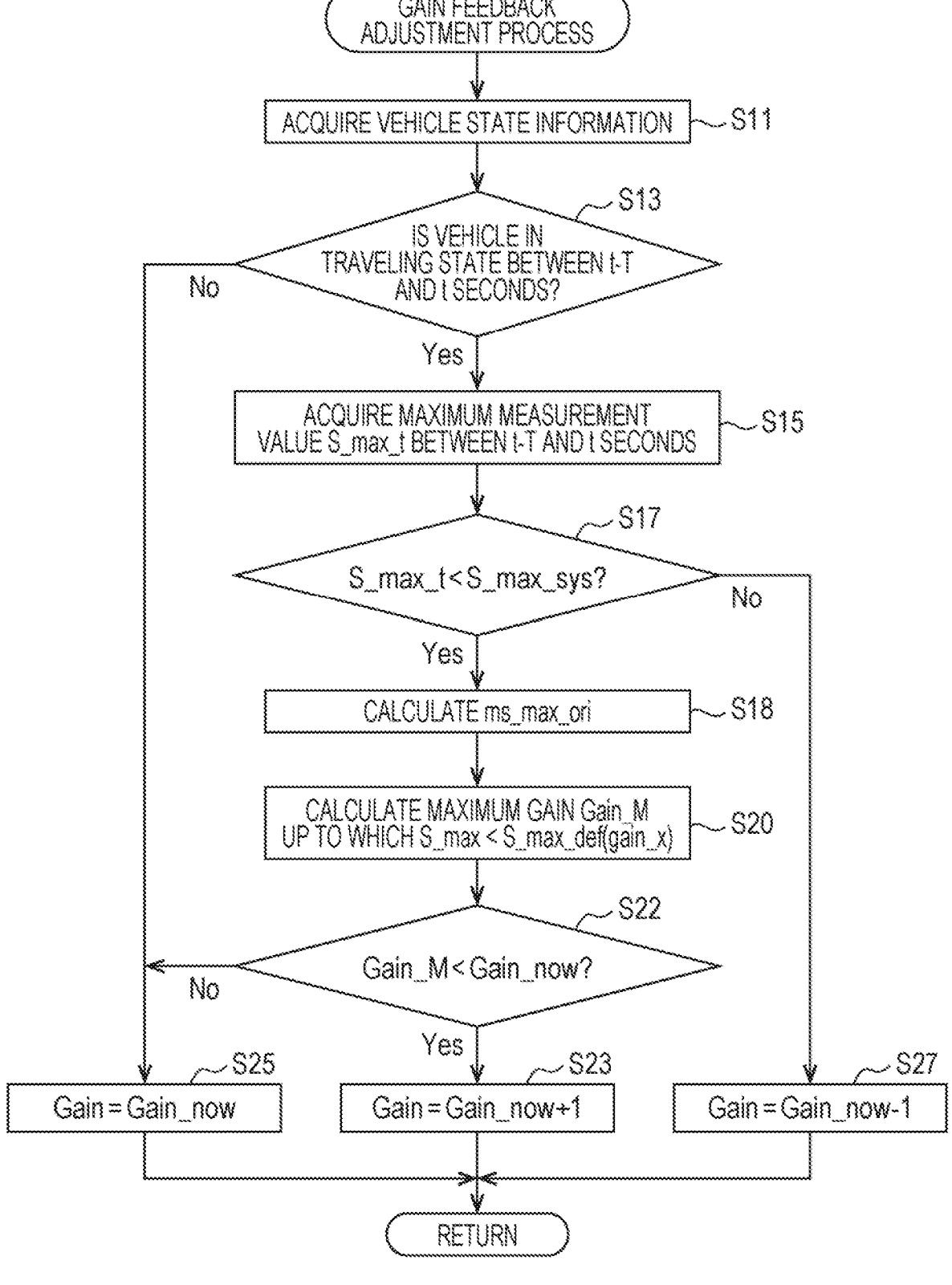
FIG. 8 is a flowchart illustrating a modification of the gain feedback adjustment process by the gain adjustment method of the load detection device according to the embodiment.

FIG. 8 is a flowchart illustrating the modification of the gain feedback adjustment process. In the flowchart illustrated in FIG. 8, the process from step S19 to step S21 in the flowchart illustrated in FIG. 6 is replaced with the process from step S18 to step S22.

In the modification, if it is determined in step S17 that the maximum measurement value S_max_t is less than the measurable maximum value S_max_sys (S17/Yes), the control device 180 calculates a basic measurement value ms_max_ori (step S18). The basic measurement value ms_max_ori corresponds to the maximum measurement value S_max_t in a case where the output gain Gain is not adjusted (Gain=1). For example, the control device 180 calculates the basic measurement value ms_max_ori by dividing the maximum measurement value S_max_t by the currently set output gain setting value Gain_now.

Subsequently, the control device 180 calculates, from among candidate output gain values, a maximum output gain Gain_M (step S20). Up to the maximum output gain Gain_M, a value S_max obtained by multiplying the basic measurement value ms_max_ori by an output gain Gain_x is less than the allowable maximum measurement value S_max_def (gain_x) corresponding to the output gain Gain.

Subsequently, the control device 180 determines whether the obtained output gain Gain_M is less than the currently set output gain setting value Gain_now (step S22). If it is not determined that the output gain Gain_M is less than the output gain setting value Gain_now (S22/No), the control device 180 maintains the output gain Gain at the current output gain setting value Gain_now (step S25). In this case, since it is not possible to increase the output gain Gain, the process of this routine is ended without adjusting the output gain Gain, and returns to step S11.

On the other hand, if it is determined that the output gain Gain_M is less than the output gain setting value Gain_now (S22/Yes), the control device 180 sets the output gain Gain to the value Gain_now+1 (step S23). The value Gain_now+1 is one level greater than the current output gain setting value Gain_now. At this time, the control device 180 may increase the output gain Gain by more than one level. However, if an increase rate of the output gain Gain is too large, there is a possibility that the measurement value S may easily exceed the allowable maximum measurement value S_max_def (gain_x) if the traveling state of the vehicle changes and the loads applied to the tires rapidly increase. Therefore, it is preferable to increase the output gain Gain little by little, for example, by one level or two levels.

Also in the gain feedback adjustment process according to the modification described above, it is possible to obtain the same effects as those in the gain feedback adjustment process described above.

(2-4-4. Effects of Gain Feedback Adjustment Process)

Figure 9:
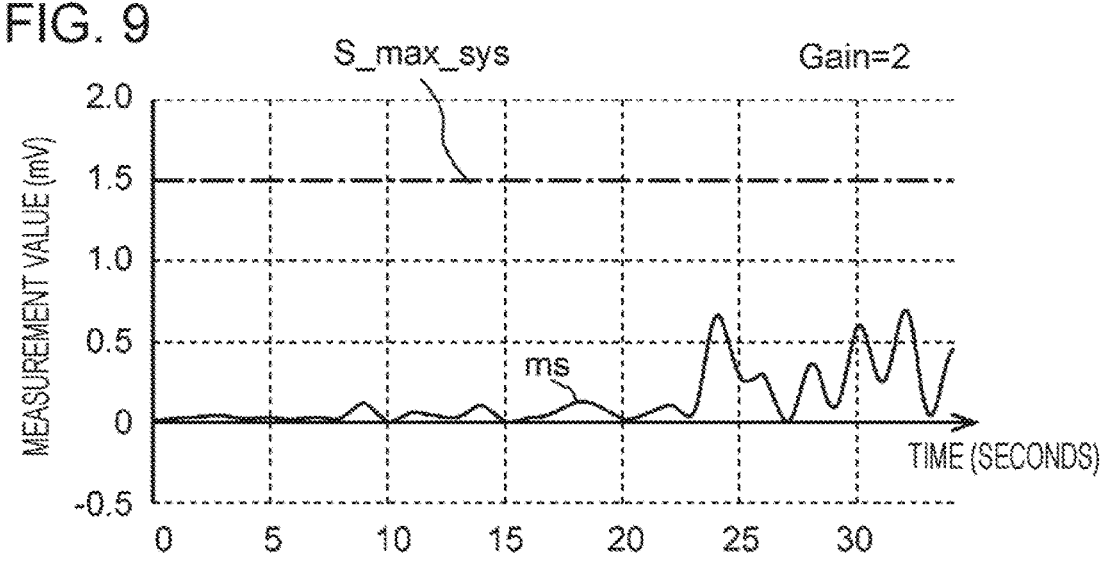
FIG. 9 is an explanatory diagram illustrating a basic measurement value in a case where an output gain is fixed and gain adjustment is not performed.
Figure 10:
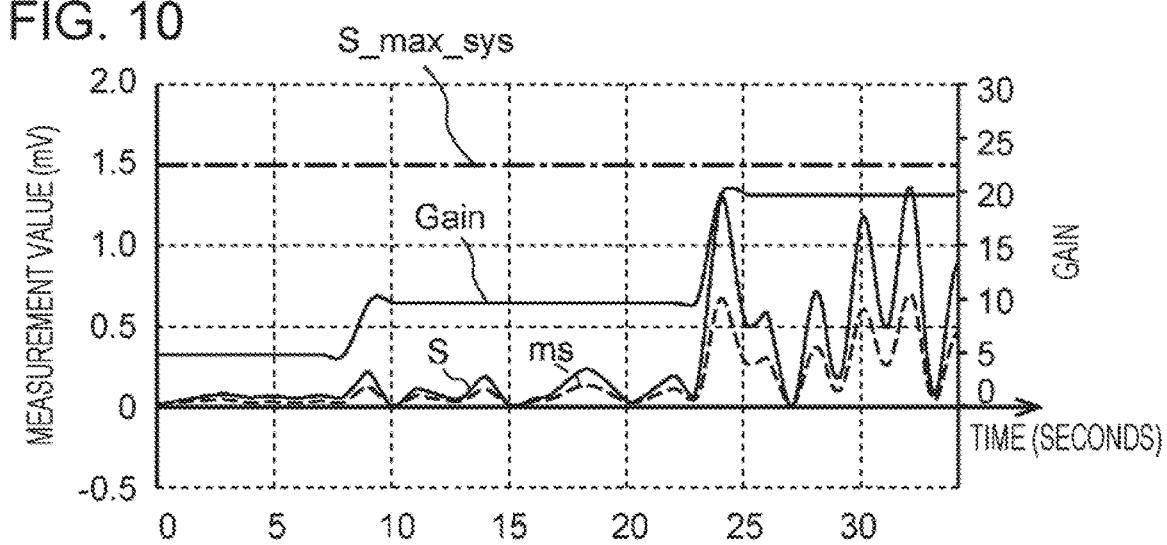
FIG. 10 is an explanatory diagram illustrating measurement values in a case where the output gain is increased by the load detection device according to the embodiment.

FIGS. 9 and 10 are explanatory diagrams illustrating an example in which the output gain is increased by the gain feedback adjustment process. Each of FIGS. 9 and 10 illustrates measurement values of a component force Fy in the vehicle width direction applied to the tire of the vehicle turning a curve. FIG. 9 illustrates a measurement value (basic measurement value) ms in a case where the output gain Gain is fixed to 2 and the gain of the output of the bridge circuit is not adjusted. FIG. 10 illustrates the measurement value S in a case where the gain of the output of the bridge circuit is adjusted. In this example, it is assumed that the measurable maximum value S_max_sys is 1.50 mV.

In the example illustrated in FIG. 9, in a case where the gain is not adjusted, in a period (first period) from the start of the measurement to 8 seconds later, the basic measurement value ms fluctuates between 0.00 and 0.05 mV. In addition, in a period (second period) from 8 seconds to 23 seconds after the start of the measurement, the basic measurement value ms fluctuates between 0.00 and 0.20 mV. Furthermore, in a period (third period) after 23 seconds, the basic measurement value ms fluctuates between 0.00 and 0.70 mV. This indicates that the traveling state of the vehicle changes in each period and the loads applied to the tires change.

In a case where the gain is not adjusted, the basic measurement value ms is significantly smaller than the measurable maximum value S_max_sys and the allowable maximum measurement value S_max_def (gain_x). Therefore, there is room for increasing the load detection accuracy by amplifying the output of the bridge circuit to change the range of the measurement value S to the larger side.

In contrast, in the example illustrated in FIG. 10, the output gain Gain is set to 5 at the start of the measurement, and the measurement value S fluctuates between 0.00 and 0.10 mV in the first period. The measurement value S in the first period is significantly lower than the measurable maximum value S_max_sys. In addition, the measurement value S is continuously less than an allowable maximum measurement value S_max_def (gain_5) corresponding to the output gain Gain. Therefore, the control device 180 doubles the output gain Gain.

Thus, the measurement value S in the second period is amplified and fluctuates between 0.00 and 0.25 mV. The basic measurement value ms in the second period has a larger fluctuation width than that in the first period due to a change in the traveling state of the vehicle. However, the measurement value S in the second period is significantly lower than the measurable maximum value S_max_sys and is continuously less than an allowable maximum measurement value S_max_def (gain_10) corresponding to the output gain Gain. Therefore, the control device 180 further doubles the output gain Gain.

Thus, the measurement value S in the third period is further amplified and fluctuates between 0.00 and 1.40 mV. The basic measurement value ms in the third period has a larger fluctuation width than that in the second period due to a change in the traveling state of the vehicle, and the maximum value of the measurement value S in the second period is close to the measurable maximum value S_max_sys. Thus, the load can be detected based on the larger measurement value S, and the load detection accuracy can be increased.

Figure 11:
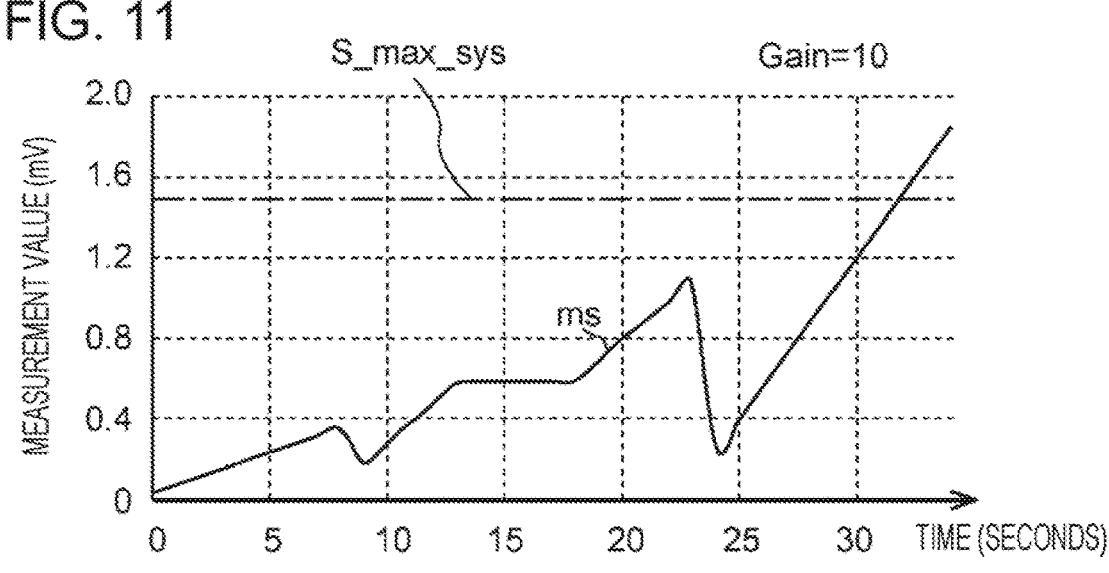
FIG. 11 is an explanatory diagram illustrating the basic measurement value in a case where the output gain is fixed and gain adjustment is not performed.
Figure 12:
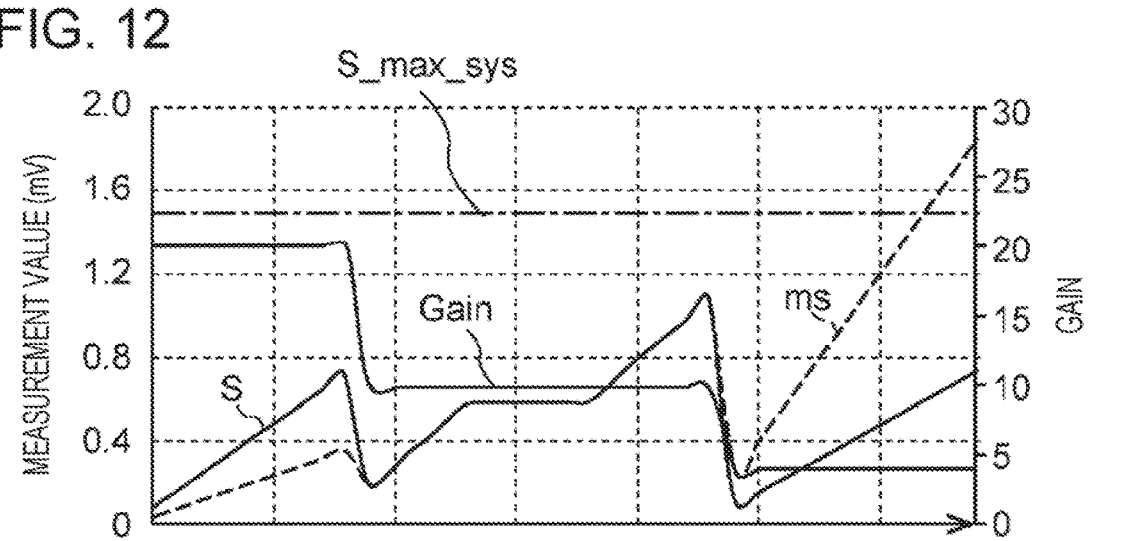
FIG. 12 is an explanatory diagram illustrating the measurement values in a case where the output gain is decreased by the load detection device according to the embodiment.

FIGS. 11 and 12 are explanatory diagrams illustrating an example in which the output gain is reduced by the gain feedback adjustment process. Each of FIGS. 11 and 12 illustrates the measurement value of a component force Fx in the vehicle longitudinal direction applied to the tire during deceleration of the vehicle. FIG. 11 illustrates the measurement value (basic measurement value) ms in a case where the output gain Gain is fixed to 10 and the gain of the output of the bridge circuit is not adjusted. FIG. 12 illustrates the measurement value S in a case where the gain of the output of the bridge circuit is adjusted. In this example, it is assumed that the measurable maximum value S_max_sys is 1.50 mV.

In the example illustrated in FIG. 11, in a case where the gain is not adjusted, in the period (first period) from the start of the measurement to 8 seconds later, the basic measurement value ms fluctuates between 0.05 and 0.35 mV. In addition, in the period (second period) from 8 seconds to 23 seconds after the start of the measurement, the basic measurement value ms fluctuates between 0.20 and 1.10 mV. Furthermore, in the period (third period) after 23 seconds, the basic measurement value ms fluctuates between 0.20 and 1.80 mV. This indicates that the traveling state of the vehicle changes in each period and the loads applied to the tires change.

In a case where the gain is not adjusted, the basic measurement value ms increases with time, exceeds the allowable maximum measurement value S_max_def (gain_10) in the second period, and exceeds the measurable maximum value S_max_sys at 32 seconds after the start of the measurement.

In contrast, in the example illustrated in FIG. 12, the output gain Gain is set to 20 at the start of the measurement, and the measurement value S fluctuates between 0.10 and 0.75 mV in the first period. The measurement value S in the first period is significantly lower than the measurable maximum value S_max_sys, but exceeds an allowable maximum measurement value S_max_def (gain_20) corresponding to the output gain Gain. Therefore, the control device 180 sets the output gain Gain to 0.5 times, and sets the same output gain Gain as in the case of FIG. 11.

Thus, the measurement value S in the second period fluctuates between 0.20 and 1.10 mV. However, as for the basic measurement value ms in the second period, the range of the measurement value S is larger than that in the first period due to a change in the traveling state of the vehicle.

Thus, although the output gain Gain is decreased, the measurement value S exceeds the allowable maximum measurement value S_max_def (gain_10) corresponding to the output gain Gain. Therefore, the control device 180 further increases the output gain Gain by 0.5 times.

Thus, the measurement value S in the third period is suppressed to be small and fluctuates between 0.10 and 0.75 mV. The basic measurement value ms in the third period exceeds the measurable maximum value S_max_sys and the allowable maximum measurement value S_max_def (gain_5). However, by decreasing the output gain Gain, the basic measurement value ms in the third period falls below the measurable maximum value S_max_sys and the allowable maximum measurement value S_max_def (gain_5). Thus, the accuracy of the measurement value S is ensured, and the measurement accuracy can be increased.

(2-4-5. Adjustment of Output Gain By Excitation-Side Gain and Measurement-Side Gain)

Figure 13:
FIG. 13 is an explanatory diagram illustrating an example in which the output gain is adjusted by adjusting the excitation-side gain and the measurement-side gain by the load detection device according to the embodiment.

FIG. 13 is an explanatory diagram illustrating that the output gain is adjusted by adjusting the excitation-side gain and the measurement-side gain. FIG. 13 illustrates the output gain Gain_determined by an excitation-side gain Gain_u and a measurement-side gain Gain_d and the measurement value S obtained by amplifying the basic measurement value ms by the output gain Gain. The measurement value S is the measurement value S of the component force Fy in the vehicle width direction applied to the tires of the vehicle traveling on a rough road.

In the period from the start of the measurement to 8 seconds later, both the excitation-side gain Gain_u and the measurement-side gain Gain_d are set to 1, and the total output gain Gain is set to 1. In the period from 8 seconds to 13 seconds, the measurement-side gain Gain_d is maintained at 1, whereas the excitation-side gain Gain_u is increased to 2.5, and the total output gain Gain is increased to 2.5. In the period from 13 seconds to 22 seconds, the excitation-side gain Gain_u is maintained at 2.5, whereas the measurement-side gain Gain_d is increased to 4, and the total output gain Gain is increased to 10. Furthermore, in the period after 22 seconds, the excitation-side gain Gain_u is increased to 5, whereas the excitation-side gain Gain_u is decreased to 2, and the total output gain Gain is maintained at 10. Thus, the basic measurement value ms is amplified according to the setting of the output gain Gain, and the range of the measurement value S is changed.

In the six-component force detector 1, differential signals are respectively output from the bridge circuits of the three force detection systems (Fx, Fy, and Fz) and the three moment detection systems (Mx, My, and Mz). However, in a case where there is a component force for which the output from the bridge circuit is insufficient, it is effective to adjust the excitation-side gain and the measurement-side gain in order to adjust a noise component and the allowable maximum measurement value. In this case, even if the total output gain Gain is the same, if there is a margin to increase the excitation-side gain Gain_u, the excitation-side gain Gain_u, not the measurement-side gain Gain_d, is preferentially increased. Thus, it is possible to set the output gain Gain in which a decrease in the resolution of the load to be measured is reduced while setting the range of the measurement value S as a target range.

In the above-described example in FIG. 13, after 22 seconds from the start of the measurement, the control device 180 maintains the total output gain Gain at 10. At the same time, the control device 180 increases the excitation-side gain Gain_u to 5 while decreasing the excitation-side gain Gain_u to 2. Thus, it is possible to increase the resolution of the load to be measured while maintaining the range of the measurement value S.

(2-4-6. Gain Feedforward Adjustment Process)

Figure 14:
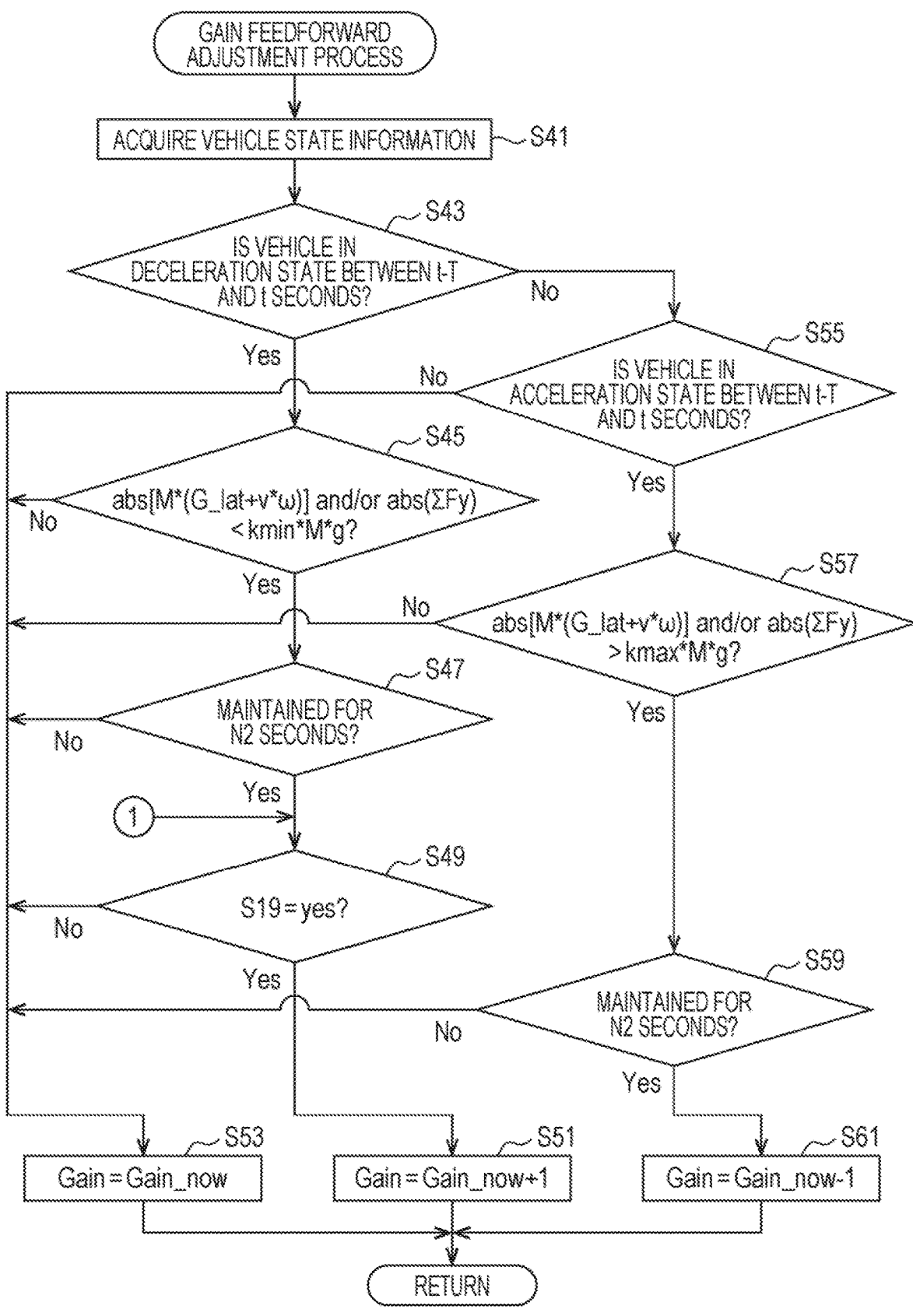
FIG. 14 is a flowchart illustrating a gain feedforward adjustment process by the gain adjustment method of the load detection device according to the embodiment.

FIG. 14 is a flowchart illustrating the gain adjustment process (gain feedforward adjustment process) based on information on the traveling state of the vehicle. The gain feedforward adjustment process may be constantly executed during activation of the system of the vehicle, or may be configured to be executed during execution of specific control using the component forces applied to the tires. The gain feedforward adjustment process described below is executed using information used in the gain feedback adjustment process, and is executed in parallel with the gain feedback adjustment process.

First, the control device 180 acquires the vehicle state information via the CAN communication driver 183 (step S41). The process details in step S41 are the same as those in step S11 in the above-described gain feedback adjustment process, and step S11 and step S41 may be one process.

Subsequently, based on the vehicle state information, the control device 180 determines whether the vehicle is in a deceleration state between the time that is T seconds before the current time t and the current time t (step S43). For example, if the acceleration of the vehicle included in the vehicle state information is a negative value, the control device 180 determines that the vehicle is in the deceleration state. However, the method of determining that the vehicle is in the deceleration state is not limited to the above example.

If the vehicle is not in the deceleration state between the time that is T seconds before the current time t and the current time t (S43/No), the following process is performed. It is determined whether the vehicle is in an acceleration state between the time that is T seconds before the current time t and the current time t (step S55). For example, if the acceleration of the vehicle included in the vehicle state information is a positive value, the control device 180 determines that the vehicle is in the acceleration state. However, the method of determining that the vehicle is in the acceleration state is not limited to the above example.

If a positive determination is made in step S43 (S43/Yes), the control device 180 executes a process of determining whether to increase the output gain Gain (step S45 to step S49). On the other hand, if a positive determination is made in step S55 (S55/Yes), the control device 180 executes a process of determining whether to decrease the output gain Gain (step S57 and step S59). On the other hand, if a negative determination is made in both step S43 and step S55 (S43/No and S55/No), the control device 180 maintains the output gain Gain at the current output gain setting value Gain_now (step S53). For example, the control device 180 maintains the excitation-side gain and the measurement-side gain at the current excitation-side gain setting value and the current measurement-side gain setting value, respectively. In this case, since it is difficult to adjust the output gain Gain by the gain feedforward adjustment process, the process of this routine is ended, and returns to step S41.

If a positive determination is made in step S43 (S43/Yes), the control device 180 determines whether one or both of the following values are less than a first threshold value based on a gravitational acceleration (step S45). The values are a value obtained by multiplying the acceleration acting on the vehicle in a predetermined direction by the weight of the vehicle and a value of the sum of the component forces acting on the respective tires in the predetermined direction. Step S45 is a process of determining whether the traveling state of the vehicle is a traveling state in which the loads applied to the tires are small, and is executed in order to predict that the basic measurement value ms in a state where the gain is not adjusted becomes a small value.

In step S45 of the flowchart illustrated in FIG. 14, the control device 180 determines, in the traveling state in which an acceleration in the vehicle width direction may be generated to the vehicle, whether one or both of the following absolute values are less than a first threshold value kmin*M*g based on a gravitational acceleration g. The absolute values are an absolute value abs $[M*(G\_lat+v*\omega)]$ of a value obtained by multiplying the sum of a lateral acceleration G_lat acting on the vehicle in the vehicle width direction and an acceleration $v*\omega$ of a centrifugal force by a weight M of the vehicle and an absolute value abs $(\Sigma Fy)$ of a sum $\Sigma Fy$ of the component forces Fy acting on respective tires in the vehicle width direction. This is a process of determining whether the loads applied to the tires in the vehicle width direction are small in a situation where the loads are applied to the tires in the vehicle width direction.

Whether the vehicle is in the traveling state in which the acceleration in the vehicle width direction can be generated to the vehicle can be determined based on, for example, information on a steering angle detected by a steering angle sensor. In addition, the lateral acceleration G_lat and the acceleration $v*\omega$ of the centrifugal force are obtained based on information on sensor values of an acceleration sensor and a yaw rate sensor, respectively. A coefficient kmin of the first threshold value kmin*M*g is a setting value of a positive value set in advance in a range of 0 to 1 in order to make it possible to simply determine that the vehicle is not traveling in a manner that the tires are close to the limits in terms of vehicle dynamics. The weight M of the vehicle may also be acquired together with the vehicle state information. It may be determined whether one of the following absolute values is less than the first threshold value kmin*M*g. The absolute values are the absolute value abs$[M*(G\_lat+v*\omega)]$ of the value obtained by multiplying the sum of the lateral acceleration G_lat and the acceleration $v*\omega$ of the centrifugal force by the weight M of the vehicle and the absolute value abs $(\Sigma Fy)$ of the sum $\Sigma Fy$ of the component forces Fy acting on the respective tires in the vehicle width direction. However, by determining whether both are less than the first threshold value kmin*M*g, the reliability of the determination result can be increased.

In a case where the vehicle is traveling straight, no loads are applied to the tires in the vehicle width direction. In this case, the control device 180 may determine whether the loads applied to the tires in the longitudinal direction is small. For example, the control device 180 determines, in a case where the vehicle is in the deceleration state while traveling straight, whether one or both of the following values are less than the first threshold value kmin*M*g based on the gravitational acceleration. The values are a value abs $[M*G\_longi]$ obtained by multiplying an absolute value abs (G_longi) of a longitudinal acceleration G_longi acting on the vehicle in the longitudinal direction by the weight M of the vehicle and an absolute value abs $(\Sigma Fx)$ of a sum $\Sigma Fx$ of the component forces Ex acting on respective tires in the longitudinal direction.

Whether the vehicle is traveling straight can be determined based on, for example, the information on the steering angle detected by the steering angle sensor. In addition, the longitudinal acceleration G_longi is obtained based on the information on the sensor value of the acceleration sensor. The first threshold value kmin*M*g for determining the loads applied to the tires in the longitudinal direction may be the same as or different from the first threshold value kmin*M*g for determining the loads applied to the tires in the vehicle width direction. In addition, it may be determined whether one of the following absolute values is less than the first threshold value kmin*M*g. The absolute values are the absolute value abs [M*(G_longi)] of the value obtained by multiplying the longitudinal acceleration G_longi by the weight M of the vehicle and the absolute value abs (ΣFx) of the sum ΣFx of the component forces Fx acting on the respective tires in the longitudinal direction. However, by determining whether both are less than the first threshold value kmin*M*g, the reliability of the determination result can be increased.

If a negative determination is made in step S45 (S45/No), the control device 180 maintains the output gain Gain at the current output gain setting value Gain_now (step S53). In this case, it is not possible to determine that there is no possibility that the measurement value S exceeds the allowable maximum measurement value S_max_def (gain_x) corresponding to the output gain if the output gain Gain is increased. Thus, the process of this routine is ended without adjusting the output gain Gain, and returns to step S41.

On the other hand, if a positive determination is made in step S45 (S45/Yes), the control device 180 determines whether the state satisfying the condition in step S45 is maintained for a second time N2 (seconds) (step S47). The value of the second time N2 is set to a value smaller than the value of the first time N1 used in step S21 in the gain feedback adjustment process. If the state satisfying the condition in step S45 is not maintained for the second time N2 (S47/No), the control device 180 maintains the output gain Gain at the current output gain setting value Gain_now (step S53). Also in this case, it is not possible to determine that there is no possibility that the measurement value S exceeds the allowable maximum measurement value S_max_def (gain_x) corresponding to the output gain even if the output gain Gain is increased. Thus, the process of this routine is ended without adjusting the output gain Gain, and returns to step S41.

On the other hand, if the state satisfying the condition in step S45 is maintained for the second time N2 (S47/Yes), the control device 180 determines whether the condition in step S19 in the gain feedback adjustment process is satisfied (whether a positive determination is made in step S19) (step S49). For example, the control device 180 determines whether the flag indicating that the condition in step S19 is satisfied is set.

If the condition in step S19 is not satisfied (S49/No), the control device 180 maintains the output gain Gain at the current output gain setting value Gain_now (step S53). Also in this case, it is not possible to determine that there is no possibility that the measurement value S exceeds the allowable maximum measurement value S_max_def (gain_x) corresponding to the output gain even if the output gain Gain is increased. Thus, the process of this routine is ended without adjusting the output gain Gain, and returns to step S41.

On the other hand, if the condition in step S19 is satisfied (S49/Yes), the control device 180 sets the setting of the output gain Gain to the value Gain_now+1 (step S51). The value Gain_now+1 is greater than the current output gain setting value Gain_now by one level. For example, the control device 180 increases one of the excitation-side gain and the measurement-side gain by one level to increase the output gain Gain. At this time, as illustrated in FIG. 7, the excitation-side gain may be preferentially increased. The second time N2 used in step S47 is set to be shorter than the first time N1 used in step S21. Thus, even before the state in which the first ratio is smaller than the second ratio, which is the condition in step S19, continues for the first time N1 or more, the output gain can be quickly increased. The output gain is increased if it is possible to determine from the traveling state of the vehicle that the measurement value does not exceed the allowable maximum measurement value.

On the other hand, if a positive determination is made in step S55 (S55/Yes), the control device 180 determines whether one or both of the following values exceed a second threshold value based on the gravitational acceleration (step S57). The values are a value obtained by multiplying the acceleration acting on the vehicle in a predetermined direction by the weight of the vehicle and a value of the sum of the component forces acting on the respective tires in the predetermined direction. Step S57 is a process of determining whether the traveling state of the vehicle is a traveling state in which the loads applied to the tires are large, and is executed in order to predict that the basic measurement value ms in a state where the gain is not adjusted becomes a large value.

In step S57 of the flowchart illustrated in FIG. 14, the control device 180 determines, in the traveling state in which an acceleration in the vehicle width direction may be generated to the vehicle, whether one or both of the following absolute values exceed a second threshold value kmax*M*g based on the gravitational acceleration g. The absolute values are the absolute value abs [M*(G_lat+v*ω)] of the value obtained by multiplying the sum of the lateral acceleration G_lat acting on the vehicle in the vehicle width direction and the acceleration v*ω of the centrifugal force by the weight M of the vehicle and the absolute value abs (ΣFy) of the sum ΣFy of the component forces Fy acting on respective tires in the vehicle width direction. This is a process of determining whether the loads applied to the tires in the vehicle width direction are large in a situation where the loads are applied to the tires in the vehicle width direction.

A coefficient kmax of the second threshold value kmax*M*g is a setting value of a positive value set in advance in a range of 0 to 1 in order to make it possible to simply determine that the vehicle is traveling in a manner that the tires are close to the limits in terms of vehicle dynamics. It may be determined whether one of the following absolute values exceeds the second threshold value kmax*M*g. The absolute values are the absolute value abs [M*(G_lat+v*ω)] of the value obtained by multiplying the sum of the lateral acceleration G_lat and the acceleration v*ω of the centrifugal force by the weight M of the vehicle and the absolute value abs (ΣFy) of the sum ΣFy of the component forces Fy acting on the respective tires in the vehicle width direction. However, by determining whether both exceed the second threshold value kmax*M*g, the reliability of the determination result can be increased.

In a case where the vehicle is traveling straight, no loads are applied to the tires in the vehicle width direction. In this case, the control device 180 may determine whether the loads applied to the tires in the longitudinal direction are large. For example, the control device 180 determines, in a case where the vehicle is in the acceleration state while traveling straight, whether one or both of the following values exceed the second threshold value kmax*M*g based on the gravitational acceleration. The values are the value abs [M*G_longi] obtained by multiplying the absolute value abs (G_longi) of the longitudinal acceleration G_longi acting on the vehicle in the longitudinal direction by the weight M of the vehicle and the absolute value abs (ΣFx) of the sum ΣFx of the component forces Fx acting on respective tires in the longitudinal direction.

The second threshold value kmax*M*g for determining the loads applied to the tires in the longitudinal direction may be the same as or different from the second threshold value kmax*M*g for determining the loads applied to the tires in the vehicle width direction. In addition, it may be determined whether one of the following absolute values exceeds the second threshold value kmax*M*g. The absolute values are the absolute value abs [M*(G_longi)] of the value obtained by multiplying the longitudinal acceleration G_longi by the weight M of the vehicle and the absolute value abs (ΣFx) of the sum ΣFx of the component forces Fx acting on the respective tires in the longitudinal direction. However, by determining whether both exceeds the second threshold value kmax*M*g, the reliability of the determination result can be increased.

If a negative determination is made in step S57 (S57/No), the control device 180 maintains the output gain Gain at the current output gain setting value Gain_now (step S53). In this case, it is not possible to determine that there is no possibility that the measurement value S exceeds the allowable maximum measurement value S_max_def (gain_x) corresponding to the output gain if the output gain Gain is increased. Thus, the process of this routine is ended without adjusting the output gain Gain, and returns to step S41.

On the other hand, if a positive determination is made in step S57 (S57/Yes), the control device 180 determines whether the state satisfying the condition in step S57 is maintained for the second time N2 (seconds) (step S59). The value of the second time N2 is set to the value smaller than the value of the first time N1 used in step S21 in the gain feedback adjustment process. If the state satisfying the condition in step S57 is not maintained for the second time N2 (S59/No), the control device 180 maintains the output gain Gain at the current output gain setting value Gain_now (step S53). Also in this case, it is not possible to determine that there is no possibility that the measurement value S exceeds the allowable maximum measurement value S_max_def (gain_x) corresponding to the output gain even if the output gain Gain is increased. Thus, the process of this routine is ended without adjusting the output gain Gain, and returns to step S41.

On the other hand, if the state satisfying the condition in step S57 is maintained for the second time N2 (S59/Yes), the control device 180 sets the setting of the output gain Gain to the value Gain_now−1 (step S61). The value Gain_now−1 is smaller than the current output gain setting value Gain_now by one level. Note that the second time N2 used in step S47 may be different from the second time N2 used in step S59.

For example, the control device 180 decreases one of the excitation-side gain and the measurement-side gain by one level to decrease the output gain Gain. As a result, the measured maximum measurement value S_max_t can be brought closer to the measurable maximum value S_max_sys. In addition, the possibility that the measurement value S measured if a similar traveling state is continued exceeds the measurable maximum value S_max_sys can be reduced. For example, by maintaining the excitation-side gain and reducing the measurement-side gain, it is possible to increase the resolution of the load to be measured while reducing the range of the measurement value S.

The control device 180 repeatedly executes the process of each step described above at the predetermined sampling period. Even if the output range from the bridge circuit of the load cell 1 is wide, the control device 180 sets the output gain Gain, based on the traveling state of the vehicle. The output gain Gain is set such that the measured maximum measurement value S_max_t is less than the measurable maximum value S_max_sys and the allowable maximum measurement value S_max_def (gain_now). Thus, the output of the bridge circuit is amplified such that the measurement value S does not exceed the measurable maximum value S_max_sys and the allowable maximum measurement value S_max_def (gain x), and the measurement accuracy of the load can be increased.

(2-4-7. Zero Point Offset Process)

Figure 15:
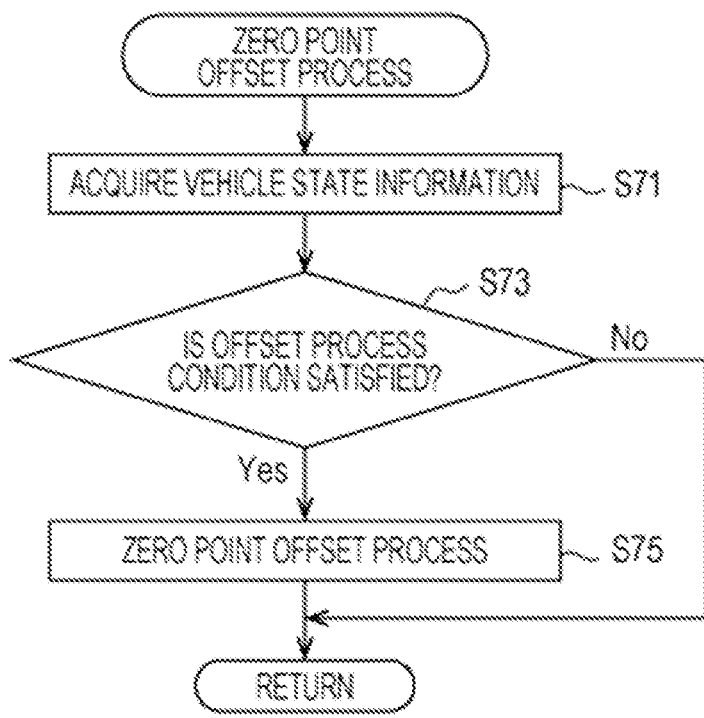
FIG. 15 is a flowchart illustrating a zero point offset process by the gain adjustment method of the load detection device according to the embodiment.

FIG. 15 is a flowchart illustrating an example of the zero point offset process. The zero point offset process may be constantly executed during activation of the system of the vehicle, or may be configured to be executed during execution of specific control using the component forces applied to the tires.

First, the control device 180 acquires the vehicle state information via the CAN communication driver 183 (step S71). The process details in step S51 are the same as those in step S11 in the above-described gain feedback adjustment process or step S41 in the gain feedforward adjustment process. Step S11, step S41, and step S51 may be one process.

Subsequently, the control device 180 determines whether an offset process condition, which is a condition under which the zero point offset process can be executed, is satisfied based on the acquired vehicle state information (step S73). The offset process condition is a condition for determining a state in which no loads are applied to the load cell 1. For example, the offset process condition may be a condition for determining that no acceleration is generated to the vehicle in the longitudinal direction and the vehicle width direction. For example, the control device 180 may determine that the offset process condition is satisfied if the vehicle is in the stopped state and the vehicle is not inclined. It is possible to determine whether the vehicle is stopped, based on information on a sensor value of a vehicle speed sensor or status information indicating the stopped state of the vehicle. In addition, it is possible to determine that the vehicle is not inclined, based on information on a sensor value of an inclination sensor.

If the offset process condition is not satisfied (S73/No), the control device 180 ends this routine and returns to step S51. On the other hand, if the offset process condition is satisfied (S73/Yes), the control device 180 executes the zero point offset process (step S73). The zero point offset process may be executed by a known method of the related art. For example, a value obtained by multiplying a measurement value, detected in a state where the offset process condition is satisfied, by −1 is recorded as an offset correction value. The offset correction value is added to the measurement value S input from the lock-in amplifier 165, and the measurement value S is corrected by an amount corresponding to an offset amount. The details of the zero point offset process are not limited to the above example.

(2-4-8. Effects of Zero Point Offset Process)

Figure 16:
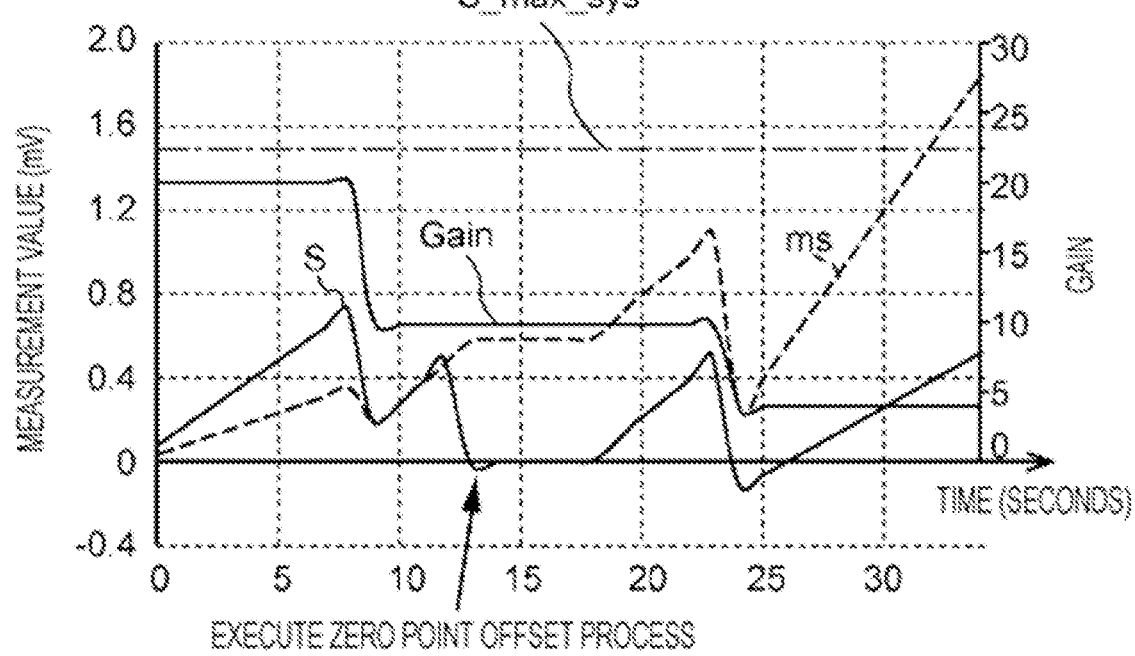
FIG. 16 is an explanatory diagram illustrating the measurement values in a case where the output gain is adjusted and the zero point offset process is performed by the load detection device according to the embodiment.

FIG. 16 illustrates an example in which the zero point offset process is executed during gain adjustment of the measurement value (basic measurement value) ms (broken line) in the same pattern as the example illustrated in FIG. 12 in a case where the gain adjustment of the output of the bridge circuit is not performed as illustrated in FIG. 11.

In the example illustrated in FIG. 16, the output gain Gain is set to 20 at the start of the measurement, and the measurement value S fluctuates between 0.10 and 0.75 mV in the first period. The measurement value S in the first period is significantly lower than the measurable maximum value S_max_sys, but exceeds the allowable maximum measurement value S_max_def (gain_20) corresponding to the output gain Gain. Therefore, the control device 180 sets the output gain Gain to 0.5 times, and sets the same output gain Gain as in the case of FIG. 11. Thus, the measurement value S changes in the same manner as in the case in FIG. 12 from 8 seconds to 12 seconds after the start of the measurement.

However, in the example illustrated in FIG. 16, the zero point offset process is executed after 13 seconds from the start of the measurement, and the measurement value S at that time is set to zero. Subsequently, the measurement value S transitions from the measurement value S in a case where the output gain Gain is adjusted as illustrated in FIG. 12 to the smaller side by the offset correction value. In this manner, by executing the zero point offset process, the accuracy of the measurement value S is further ensured, and the measurement accuracy can be further increased.

The preferred embodiment of the disclosure has been described above in detail with reference to the accompanying drawings, but the disclosure is not limited to such examples. It is clear that a person having ordinary skill in the art can conceive of various modifications or corrections within the technical idea described in the claims. It is to be understood that these are naturally included in the technical scope of the disclosure.

For example, the above-described embodiment has described an example of the load cell in which the single-axis strain gauge is used, but the load cell to which the technology of the present disclosure can be applied is not limited to such an example. For example, the technology of the present disclosure can also be applied to a load cell using a biaxial shear strain gauge illustrated in FIGS. 17 and 18.

Figure 17:
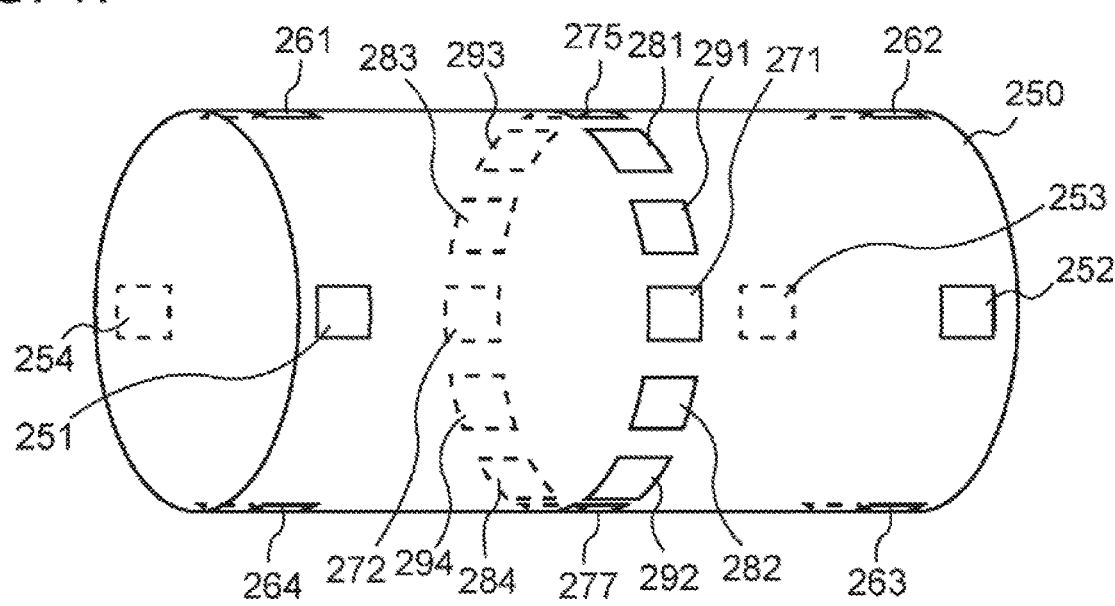
FIG. 17 is a schematic diagram illustrating the arrangement of strain gauges in the six-component force detector according to a modification.
Figure 18:
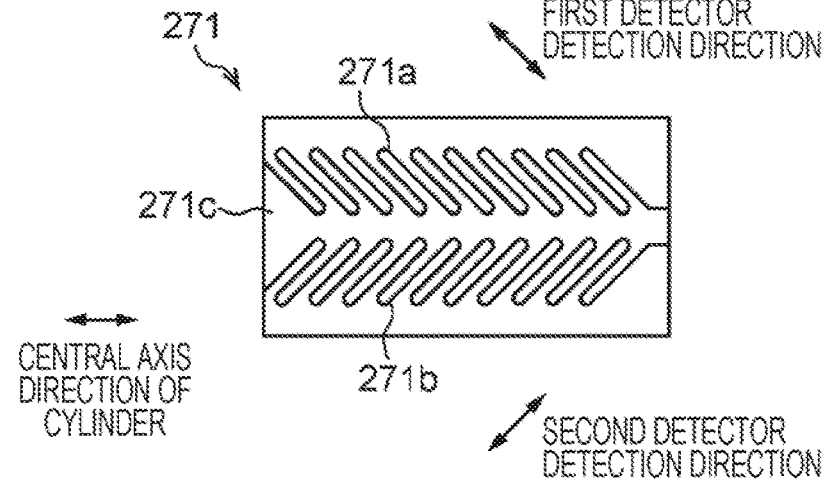
FIG. 18 is an explanatory diagram illustrating a gauge pattern of a biaxial shear strain gauge.

For example, FIG. 17 is a schematic diagram illustrating an arrangement of strain gauges in a six-component force detector according to a modification, and FIG. 18 is an explanatory diagram illustrating a gauge pattern of the biaxial shear strain gauge. The six-component force detector illustrated in FIG. 17 is provided with shear strain gauges 271 and 272 of the Fx detection system and shear strain gauges 275 and 277 of the Fz detection system, which will be described below. The shear strain gauges 271 and 272 and the shear strain gauges 275 and 277 are provided instead of the strain gauges 21 to 24 of the Fx detection system and the strain gauges 31 to 34 of the Fz detection system. FIG. 18 illustrates the shear strain gauge 271 as an example, but the shear strain gauges 272, 275, and 277 also have substantially the same gauge pattern.

The shear strain gauge 271 is configured as a so-called arrow-shaped biaxial (bipolar) strain gauge. In the shear strain gauge 271, a first detector 271a and a second detector 271b made of a Cr—N thin film or the like are formed on a common insulating layer 271c, which is an insulating thin film. Each of the first detector 271a and the second detector 271b is configured by sequentially connecting, in series, linear portions arranged in parallel along the detection directions. The first detector 271a and the second detector 271b are set such that the electric resistance easily changes in accordance with the strain in the direction (detection direction) in which the linear portion expands and contracts. The detection directions of the first detector 271a and the second detector 271b are arranged to be substantially orthogonal to each other. The shear strain gauge 271 is attached to the outer peripheral surface of a cylinder 250 in the following manner. The detection directions of the first detector 271a and the second detector 271b are inclined in opposite directions by 45° with respect to the central axis direction of the cylinder 250. Note that the shear strain gauges 272, 275, and 277 are attached to the outer peripheral surface of the cylinder 250 in substantially the same manner.

As illustrated in FIG. 17, the shear strain gauges 271, 272, 275, and 277 are attached to the outer peripheral surface of the center of the cylinder 250 in the central axis direction. The shear strain gauge 271 of the Fx detection system is disposed in the middle between strain gauges 251 and 252 of the Mx detection system. The shear strain gauge 272 of the Fx detection system is disposed in the middle between strain gauges 253 and 254 of the Mx detection system (at a position symmetrical to the shear strain gauge 271 with respect to the central axis). The shear strain gauge 275 of the Fz detection system is disposed in the middle between strain gauges 261 and 262 of the Mz detection system. The shear strain gauge 277 of the Fz detection system is disposed in the middle between strain gauges 263 and 264 of the Mz detection system (at a position symmetrical to the shear strain gauge 275 with respect to the central axis).

Furthermore, strain gauges 281 to 284 of the Fy detection system and strain gauges 291 to 294 of the My detection system are arranged at positions shifted around the central axis. This is for avoiding interference with the strain gauges 271 and 272 of the Fx detection system and the strain gauges 275 and 277 of the Fz detection system. For example, as illustrated in FIG. 17, the shear strain gauge 271, the strain gauge 282, the strain gauge 292, the shear strain gauge 277, the strain gauge 284, and the strain gauge 294 may be sequentially arranged along the circumferential direction of the cylinder 250 at positions shifted at intervals of 30° about the central axis. In addition, the shear strain gauge 272, the strain gauge 283, the strain gauge 293, the shear strain gauge 275, the strain gauge 281, and the strain gauge 291 may be sequentially arranged along the circumferential direction of the cylinder 250 at positions shifted at intervals of 30° about the central axis.

The first detector and the second detector included in each of the shear strain gauges 271 and 272 of the Fx detection system constitute a bridge circuit that is substantially the same as the bridge circuit illustrated in FIG. 3. This bridge circuit generates an output corresponding to a component force in an Fx direction input to the cylinder 250. Similarly, the first detector and the second detector included in each of the shear strain gauges 275 and 277 of the Fz detection system constitute a bridge circuit that is substantially the same as the bridge circuit illustrated in FIG. 3. This bridge circuit generates an output corresponding to a component force in an Fz direction input to the cylinder 250.

The technology of the present disclosure can also be applied to the load cell using the biaxial shear strain gauge configured as described above, and the effects obtained by the above-described embodiment can be achieved.

REFERENCE SIGNS LIST

1 load cell
21, 22, 23, 24 strain gauge
80 bridge circuit
81 first terminal
82 second terminal
83 third terminal
84 fourth terminal
160 measurement circuit
161 excitation-side differential amplifier circuit
163 measurement-side differential amplifier circuit
165 lock-in amplifier 180 control device
183 CAN communication driver
191 CAN bus
200 load detection device
The invention claimed is:

1. A load detection device configured to detect a load applied to a measurement object, based on a differential signal output from a load cell having a bridge circuit to which a strain gauge is connected, the load detection device comprising:

an excitation-side differential amplifier circuit configured to amplify an excitation signal to be transmitted to the load cell;

a measurement-side differential amplifier circuit configured to amplify a first differential signal output from the load cell; and a control device configured to control the excitation-side differential amplifier circuit and the measurement-side differential amplifier circuit, wherein the control device is configured to execute a gain adjustment process of adjusting an output gain by selecting an excitation-side gain by the excitation-side differential amplifier circuit and a measurement-side gain by the measurement-side differential amplifier circuit such that a measurement value measured based on a second differential signal output from the measurement-side differential amplifier circuit falls within a predetermined range, the excitation-side gain and the measurement-side gain being selected from among candidate excitation-side gain values set at predetermined intervals as the excitation-side gain and candidate measurement-side gain values set at predetermined intervals as the measurement-side gain, respectively.

2. The load detection device according to claim 1, wherein the load detection device is a device configured to detect component forces acting on one of tires of a vehicle, and the control device is configured to, in the gain adjustment process, in a case where the vehicle is in a traveling state within a predetermined period before a current time, and a maximum measurement value that is a maximum value of the measurement value within the predetermined period is less than a predetermined measurable maximum value that is measurable by the load detection device, determine whether a first ratio is smaller than a second ratio, the first ratio being a ratio of the maximum measurement value to an allowable maximum measurement value up to which it is possible to ensure the measurement value and which is determined in accordance with the output gain that is currently set, the second ratio being a ratio of the output gain that is one level smaller to the output gain that is currently set, and increase the output gain in a case where a state in which the first ratio is smaller than the second ratio continues for a predetermined first time or more.

3. The load detection device according to claim 2, wherein the control device is configured to, even before the state in which the first ratio is smaller than the second ratio continues for the predetermined first time or more, increase the output gain in a case where the vehicle is in a deceleration state and one or both of a value obtained by multiplying an acceleration acting on the vehicle in a predetermined direction by a weight of the vehicle and a value of a sum of component forces acting on the respective tires in the predetermined direction are continuously less than a first threshold value based on a gravitational acceleration for the predetermined period.

4. The load detection device according to claim 3, wherein the control device is configured to, even before the state in which the first ratio is smaller than the second ratio continues for the predetermined first time or more, increase the output gain in a case where the vehicle is in the deceleration state and one or both of a value obtained by multiplying a sum of a lateral acceleration acting on the vehicle in a vehicle width direction and a centrifugal acceleration by the weight of the vehicle and a value of a sum of component forces acting on the respective tires in the vehicle width direction are continuously less than the first threshold value for the predetermined period.

5. The load detection device according to claim 3, wherein the control device is configured to, even before the state in which the first ratio is smaller than the second ratio continues for the predetermined first time or more, increase the output gain in a case where the vehicle is in the deceleration state while the vehicle is traveling straight and one or both of a value obtained by multiplying an absolute value of a longitudinal acceleration acting on the vehicle in a longitudinal direction by the weight of the vehicle and a value of a sum of component forces acting on the respective tires in the longitudinal direction are continuously less than the first threshold value for the predetermined period.

6. The load detection device according to claim 2, wherein the control device is configured to, in the gain adjustment process, decrease the output gain in a case where the vehicle is in the traveling state within the predetermined period and the maximum measurement value within the predetermined period is the predetermined measurable maximum value or more.

7. The load detection device according to claim 2, wherein the control device is configured to, in the gain adjustment process, decrease the output gain in a case where one or both of a value obtained by multiplying an acceleration acting on the vehicle in a predetermined direction by a weight of the vehicle and a value of a sum of component forces acting on the respective tires in the predetermined direction continuously exceed a second threshold value based on a gravitational acceleration for the predetermined period.

8. The load detection device according to claim 7, wherein the control device is configured to decrease the output gain in a case where the vehicle is in an acceleration state and one or both of a value obtained by multiplying a sum of a lateral acceleration acting on the vehicle in a vehicle width direction and a centrifugal acceleration by the weight of the vehicle and a value of a sum of component forces acting on the respective tires in the vehicle width direction continuously exceed the second threshold value for the predetermined period.

9. The load detection device according to claim 7, wherein the control device is configured to decrease the output gain in a case where the vehicle is continuously traveling straight and one or both of a value obtained by multiplying an absolute value of a longitudinal acceleration acting on the vehicle in a longitudinal direction by the weight of the vehicle and a value of a sum of component forces acting on the respective tires in the longitudinal direction continuously exceed the second threshold value for the predetermined period.

10. The load detection device according to claim 1, wherein the control device is configured to, in the gain adjustment process, determine whether it is possible to increase the excitation-side gain, and in a case where it is possible to increase the excitation-side gain, preferentially increase the excitation-side gain over the measurement-side gain.

11. The load detection device according to claim 1, wherein the control device is configured to determine whether no load is applied to the strain gauge and whether an appropriate posture is maintained, and in a case where no load is applied to the strain gauge and the appropriate posture is maintained, execute a zero point offset process of the measurement value.

12. A gain adjustment method of a load detection device for adjusting a gain of the load detection device configured to detect a load applied to a measurement object, based on a differential signal output from a load cell having a bridge circuit to which a strain gauge is connected, the gain adjustment method comprising:

amplifying, by an excitation-side differential amplifier circuit, an excitation signal to be transmitted to the load cell;

amplifying, by a measurement-side differential amplifier circuit, a first differential signal output from the load cell; and adjusting an output gain by selecting an excitation-side gain by the excitation-side differential amplifier circuit and a measurement-side gain by the measurement-side differential amplifier circuit such that a measurement value measured based on a second differential signal output from the measurement-side differential amplifier circuit falls within a predetermined range, the excitation-side gain and the measurement-side gain being selected from among candidate excitation-side gain values set at predetermined intervals as the excitation-side gain and candidate measurement-side gain values set at predetermined intervals as the measurement-side gain, respectively.

* * * * *